US012471877B2

(12) United States Patent
Konkle et al.

(10) Patent No.: US 12,471,877 B2
(45) Date of Patent: Nov. 18, 2025

(54) PHOTON COUNTING COMPUTED TOMOGRAPHY (PCCT) DETECTOR SENSOR REPAIR FOR INCREASED SENSOR YIELD

(71) Applicant: GE Precision Healthcare LLC, Wauwatosa, WI (US)

(72) Inventors: Nicholas R Konkle, Sussex, WI (US); Brian D Yanoff, Niskayuna, NY (US); John M Boudry, Waukesha, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 545 days.

(21) Appl. No.: 17/805,834

(22) Filed: Jun. 7, 2022

(65) Prior Publication Data
US 2023/0389884 A1  Dec. 7, 2023

(51) Int. Cl.
*A61B 6/42*  (2024.01)
*A61B 6/00*  (2006.01)
(Continued)

(52) U.S. Cl.
CPC .............. *A61B 6/586* (2013.01); *A61B 6/032* (2013.01); *A61B 6/4241* (2013.01);
(Continued)

(58) Field of Classification Search
None
See application file for complete search history.

(56) References Cited

U.S. PATENT DOCUMENTS

| | | | | |
|---|---|---|---|---|
| 5,081,687 A | * | 1/1992 | Henley | G09G 3/006 |
| | | | | 714/E11.154 |
| 5,434,417 A | * | 7/1995 | Nygren | G01T 1/242 |
| | | | | 250/370.1 |

(Continued)

FOREIGN PATENT DOCUMENTS

| | | |
|---|---|---|
| JP | 2011108890 A | 6/2011 |
| JP | 2011159744 A | 8/2011 |
| JP | 2020534539 A | 11/2020 |

OTHER PUBLICATIONS

JP application 2023-085855 filed May 25, 2023—Office Action issued Jun. 5, 2024; Machine Translation; 7 pages.

(Continued)

*Primary Examiner* — Thomas R Artman
(74) *Attorney, Agent, or Firm* — McCoy Russell LLP

(57) ABSTRACT

Methods and systems are provided for repairing a defective segment of a sensor array of a photon counting detector of a photon counting computed tomography (PCCT) imaging system. In one example, a method for a PCCT imaging system comprises dividing a segment of the sensor array into a plurality of sub-segments, wherein each sub-segment of the plurality of sub-segments is electrically coupled to a readout electronics, the readout electronics configured to calculate a photon count for the segment; generating a total photon count for the divided segment based on combined electrical signals produced at each sub-segment of the divided segment; and reconstructing an image based on the total photon count at the divided segment. A defect detected in the divided segment may be traced to a defective sub-segment, which may be isolated from the readout electronics, thereby increasing a quality of the reconstructed image.

20 Claims, 7 Drawing Sheets

(51) Int. Cl.
  *A61B 6/03* (2006.01)
  *A61B 6/58* (2024.01)
  *B23K 26/21* (2014.01)
  *G01R 31/28* (2006.01)
  *G01R 31/52* (2020.01)
  *G01T 1/24* (2006.01)

(52) U.S. Cl.
  CPC .......... *A61B 6/5205* (2013.01); *A61B 6/5258* (2013.01); *B23K 26/21* (2015.10); *G01R 31/28* (2013.01); *G01R 31/52* (2020.01); *G01T 1/242* (2013.01); *G01T 1/247* (2013.01)

(56) References Cited

U.S. PATENT DOCUMENTS

| | | | |
|---|---|---|---|
| 5,552,607 A | 9/1996 | Salisbury et al. | |
| 5,821,540 A * | 10/1998 | Sato | G01T 1/242 250/370.06 |
| 5,976,978 A | 11/1999 | Salisbury | |
| 6,396,253 B1 | 5/2002 | Petrick et al. | |
| RE37,847 E * | 9/2002 | Henley | G01R 31/316 382/141 |
| 7,139,950 B2 * | 11/2006 | Huisman | G01R 31/318536 714/726 |
| 7,187,204 B2 * | 3/2007 | Tanada | G01R 31/2853 326/54 |
| 7,554,359 B2 * | 6/2009 | Tanada | G09G 3/20 326/54 |
| 8,183,535 B2 * | 5/2012 | Danielsson | G01T 1/243 250/370.09 |
| 8,637,828 B2 | 1/2014 | Okada | |
| 9,488,739 B2 * | 11/2016 | Pelc | G01T 1/247 |
| 10,126,437 B1 * | 11/2018 | Danielsson | G01T 1/241 |
| 10,247,833 B2 * | 4/2019 | Sjolin | G01T 1/24 |
| 10,274,610 B2 * | 4/2019 | Nelson | G01T 1/2002 |
| 10,386,506 B2 * | 8/2019 | Danielsson | G01T 1/242 |
| 10,433,811 B2 * | 10/2019 | Jacob | A61B 6/4233 |
| 10,575,801 B2 * | 3/2020 | Danielsson | G01T 1/17 |
| 10,751,020 B2 * | 8/2020 | Konno | A61B 6/542 |
| 10,884,143 B2 * | 1/2021 | Onouchi | A61B 6/585 |
| 10,898,159 B2 * | 1/2021 | Edic | A61B 6/587 |
| 11,150,361 B2 * | 10/2021 | Danielsson | A61B 6/5235 |
| 11,175,418 B2 | 11/2021 | Bai | |
| 11,860,319 B2 * | 1/2024 | Wiedmann | G01T 1/17 |
| 12,004,895 B2 * | 6/2024 | Maltz | G01T 1/17 |
| 12,193,867 B2 * | 1/2025 | Kim | G06T 1/0007 |
| 12,248,108 B2 * | 3/2025 | Wiedmann | G01T 1/241 |
| 2005/0035805 A1 * | 2/2005 | Tanada | G09G 3/006 327/291 |
| 2005/0166108 A1 * | 7/2005 | Huisman | G01R 31/318536 714/726 |
| 2007/0159211 A1 * | 7/2007 | Tanada | G09G 3/006 326/105 |
| 2008/0077835 A1 * | 3/2008 | Khoche | G11C 29/44 714/733 |
| 2010/0204942 A1 * | 8/2010 | Danielsson | G01T 1/242 702/85 |
| 2011/0180716 A1 * | 7/2011 | Okada | G01T 1/243 250/370.08 |
| 2011/0186742 A1 * | 8/2011 | Okada | H04N 5/32 250/370.08 |
| 2015/0168570 A1 * | 6/2015 | Pelc | G01N 23/046 378/5 |
| 2018/0042562 A1 * | 2/2018 | Danielsson | A61B 6/4035 |
| 2018/0136340 A1 * | 5/2018 | Nelson | G01T 1/1611 |
| 2018/0177481 A1 * | 6/2018 | Jacob | G01T 1/242 |
| 2018/0217277 A1 * | 8/2018 | Sjolin | G01T 1/17 |
| 2018/0329082 A1 * | 11/2018 | Danielsson | G01T 1/241 |
| 2018/0329083 A1 * | 11/2018 | Danielsson | G01T 1/241 |
| 2019/0029628 A1 | 1/2019 | Konno | |
| 2019/0383954 A1 | 12/2019 | Onouchi | |
| 2020/0158895 A1 * | 5/2020 | Danielsson | A61B 6/032 |
| 2020/0222024 A1 * | 7/2020 | Edic | G01N 23/046 |
| 2020/0301032 A1 * | 9/2020 | Bai | A61B 6/585 |
| 2021/0173104 A1 | 6/2021 | Cao | |
| 2023/0277152 A1 * | 9/2023 | Kim | A61B 6/4241 378/19 |
| 2023/0288580 A1 * | 9/2023 | Wiedmann | A61B 6/4241 |
| 2023/0293135 A1 * | 9/2023 | Maltz | A61B 6/032 |
| 2023/0389884 A1 * | 12/2023 | Konkle | G01T 1/242 |
| 2024/0032879 A1 * | 2/2024 | Fan | A61B 6/5235 |
| 2024/0085575 A1 * | 3/2024 | Wiedmann | G01T 1/247 |

OTHER PUBLICATIONS

JP2011108890 English Abstract, Espacenet search Sep. 5, 2024; 1 page.
EP application 23174474.9 filed May 22, 2023—extended Search Report Oct. 30, 2023; 10 pages.
Mats Danielsson et al: "Photon-counting x-ray detectors for CT", Physics in Medicine and Biology, Institute of Physics Publishing, vol. 66, No. 3, Jan. 28, 2021, XP020359782, ISSN: 0031-9155, DOI: 10.1088/1361-6560/ABC5A5 [retrieved on Jan. 28, 2021].

* cited by examiner

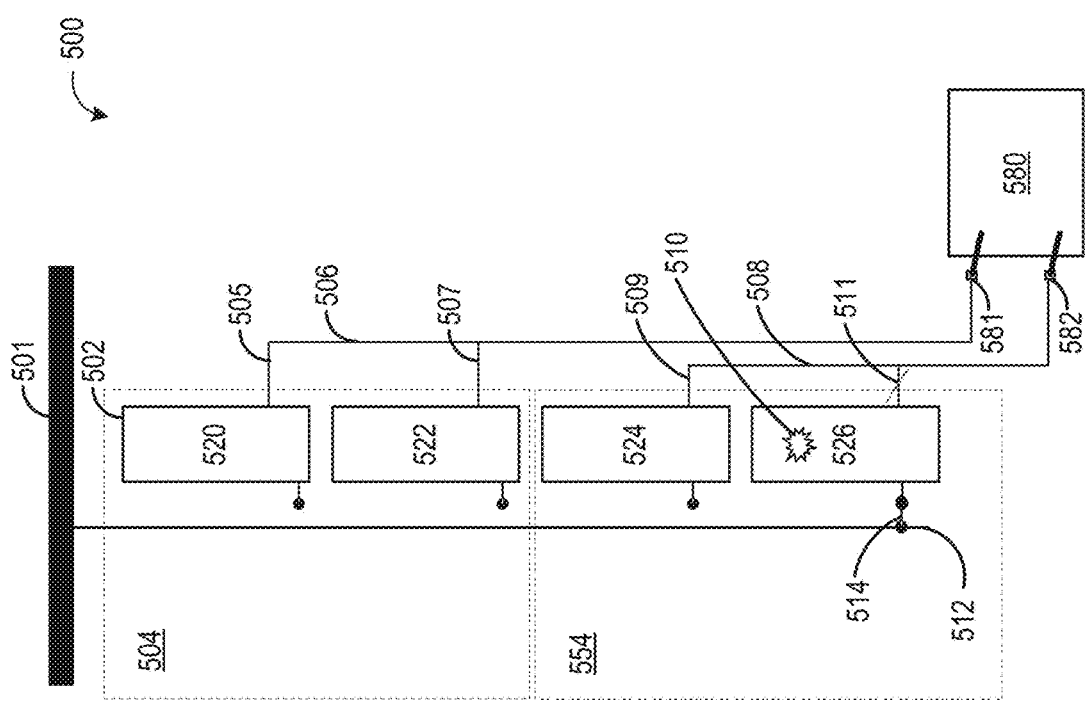

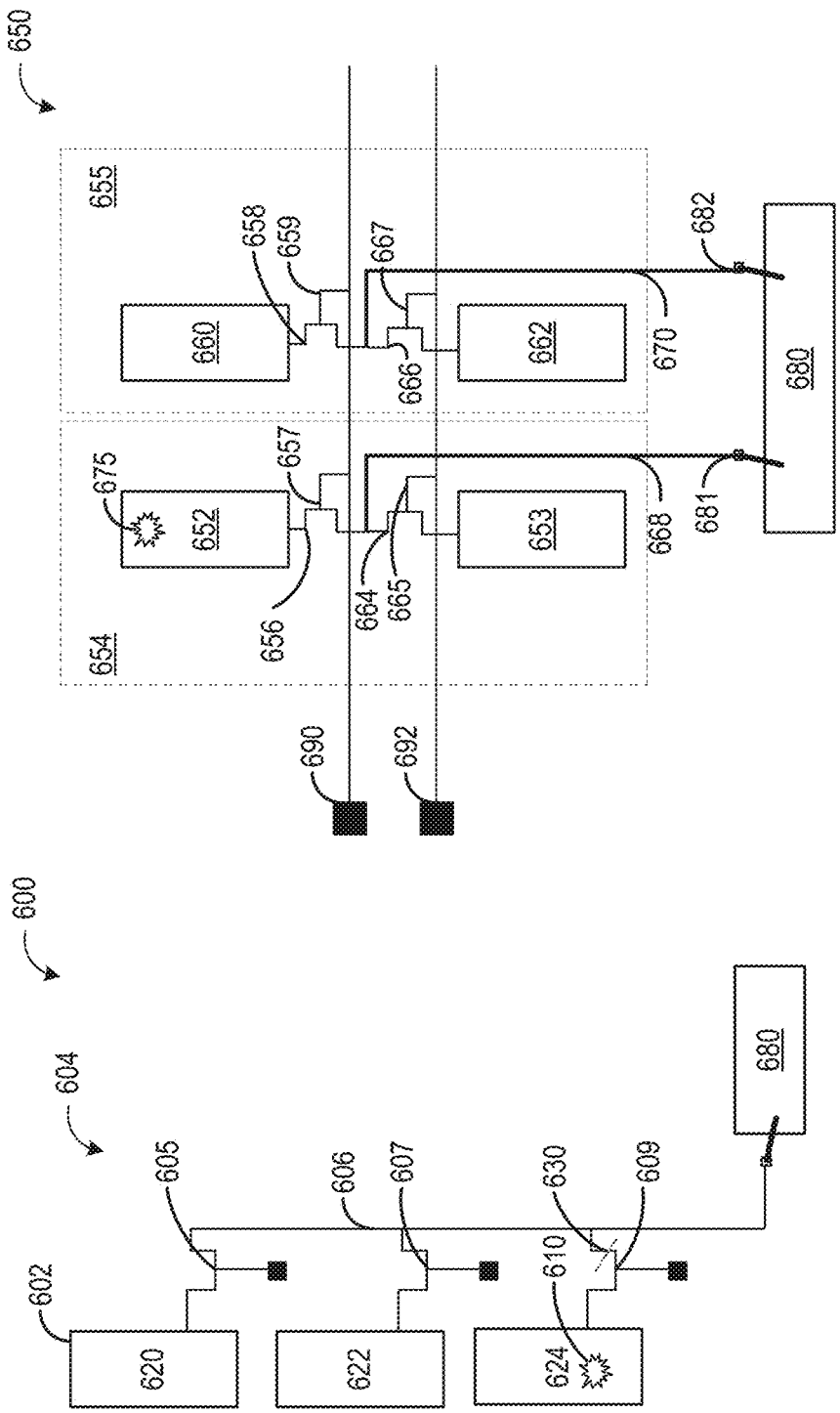

PHOTON COUNTING COMPUTED TOMOGRAPHY (PCCT) DETECTOR SENSOR REPAIR FOR INCREASED SENSOR YIELD

TECHNICAL FIELD

Embodiments of the subject matter disclosed herein relate to medical imaging, and more particularly, to computerized tomography (CT) imaging systems.

BACKGROUND

Photon counting computed tomography (PCCT) imaging systems may rely on detectors with sensor arrays made using silicon as a semiconductor sensor material. The sensor arrays may include a plurality of segments oriented in a direction of an X-ray, to account for pile-up. A number of segments in the direction may be minimized to conserve channels to an application-specific integrated circuit (ASIC) for analog/digital (A/D) conversion and readout, as fewer channels may reduce a cost of the sensors and an amount of heat generated by the sensor readout electronics during use. However, a disadvantage of having fewer segments is that if a segment of a sensor array is unusable (due to high leakage current or other defect), the sensor array may be rendered unusable in the center of the detector, due to efficiency loss and potential image artefacts. If several segments within a sensor array are unusable, the sensor array may be rendered totally unusable.

SUMMARY

The current disclosure at least partially addresses one or more of the above identified issues by a method for a PCCT imaging system, comprising dividing a segment of a sensor array of a photon counting detector of the PCCT imaging system into a plurality of sub-segments, wherein each sub-segment of the plurality of sub-segments is electrically coupled to a readout electronics, the readout electronics configured to calculate a photon count for the segment; generating a total photon count for the divided segment based on combined electrical signals produced at each sub-segment of the divided segment; and reconstructing an image based on the total photon count at the divided segment. A defect detected in the divided segment may then be traced to a defective sub-segment, which may be isolated from the readout electronics, thereby increasing a quality of the reconstructed image.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which:

FIG. 5 is a schematic diagram showing a second alternative configuration of sub-segments of a segment of a sensor array of a PCCT imaging system, in accordance with one or more embodiments of the present disclosure;

FIG. 6A is a schematic diagram showing a third alternative configuration of sub-segments of a segment of a sensor array of a PCCT imaging system, in accordance with one or more embodiments of the present disclosure;

FIG. 6B is a schematic diagram showing a fourth alternative configuration of sub-segments of a segment of a sensor array of a PCCT imaging system, in accordance with one or more embodiments of the present disclosure;

Figure 1:
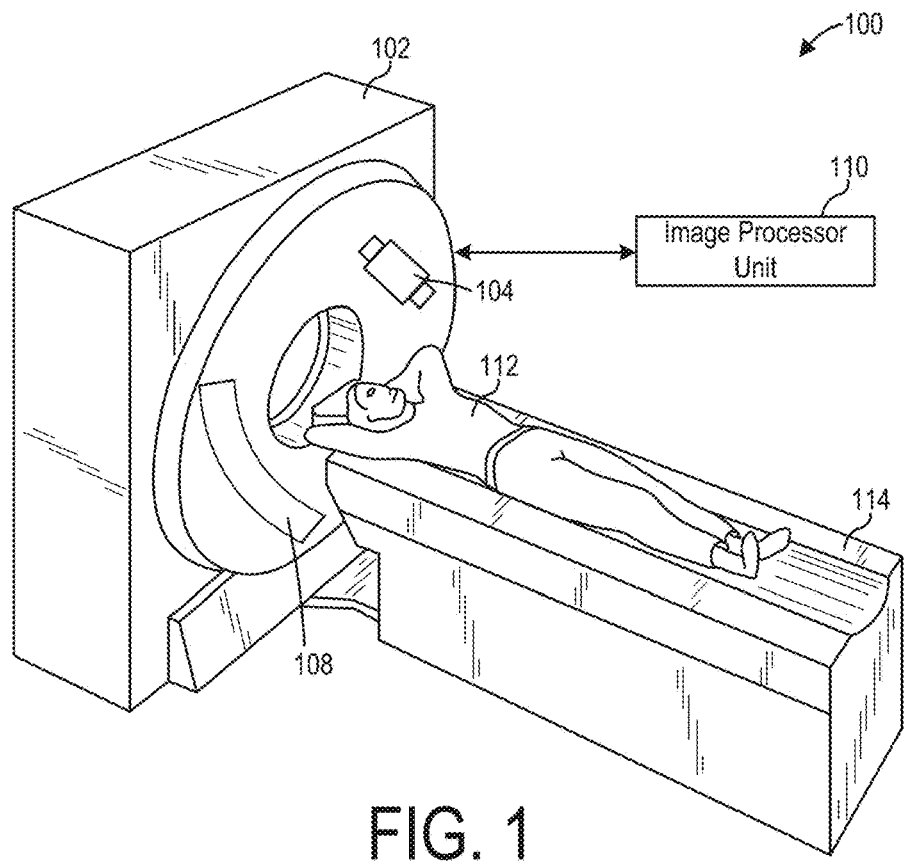
FIG. 1 shows a pictorial view of a CT imaging system, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

This description and embodiments of the subject matter disclosed herein relate to methods and systems for increasing a quality of images acquired via a photon counting computed tomography (PCCT) imaging system. Typically, in computed tomography (CT) imaging systems, an X-ray source emits a fan-shaped beam or a cone-shaped beam towards an object, such as a patient. Generally, in CT systems the X-ray source and the detector array are rotated about a gantry within an imaging plane and around the patient, and images are generated from projection data at a plurality of views at different view angles. For example, for one rotation of the X-ray source, 984 views may be generated by the CT system. The beam, after being attenuated by the patient, impinges upon an array of radiation detectors. The X-ray detector or detector array typically includes a collimator for collimating X-ray beams received at the detector, a scintillator disposed adjacent to the collimator for converting X-rays to light energy, and photodiodes for receiving the light energy from the adjacent scintillator and producing electrical signals therefrom. An intensity of the attenuated beam radiation received at the detector array is typically dependent upon the attenuation of the X-ray beam by the patient. Each detector element of a detector array produces a separate electrical signal indicative of the attenuated beam received by each detector element. The electrical signals are transmitted to a data processing system for analysis. The data processing system processes the electrical signals to facilitate generation of an image.

Such conventional CT imaging systems utilize detectors that convert radiographic energy into current signals that are integrated over a time period, then measured and ultimately digitized. However, a drawback of such detectors is their inability to provide data or feedback as to the number and/or energy of photons detected. That is, the light emitted by the scintillator is a function of both a number of X-rays impinged and an energy level of the X-rays. The photodiodes may not be capable of discriminating between the energy level or the photon count from the scintillation. For example, two scintillators may illuminate with equivalent intensity and, as such, provide equivalent output to their respective photodiodes. Yet, despite yielding an equivalent light output, the number of X-rays received by each scintillator may be different, and an intensity of the X-rays may be different.

In contrast, PCCT detectors may provide photon counting and/or energy discriminating feedback with high spatial resolution. PCCT detectors can be caused to operate in an X-ray counting mode, an energy measurement mode of each X-ray event, or both. In other words, these energy discriminating, direct conversion detectors are capable of not only X-ray counting, but also providing a measurement of the energy level of each X-ray detected. A direct conversion energy discriminating detector may include a plurality of sensors made of a semiconductor material, such as silicon.

PCCT detectors support not only X-ray photon counting, but energy measurement or tagging as well. As such, the present invention supports the acquisition of both anatomical detail as well as tissue characterization information. In this regard, the energy discriminating information or data may be used to reduce the effects of beam hardening and the like. Furthermore, these detectors support the acquisition of tissue discrimination data and therefore provide diagnostic information that is indicative of disease or other pathologies. PCCT detectors can also be used to detect, measure, and characterize materials that may be injected into a subject, such as contrast agents and/or other specialized materials, by the use of optimal energy weighting to boost the contrast of iodine and calcium (and other high atomic-number materials). Contrast agents can, for example, include iodine that is injected into the blood stream for better visualization.

Pile-up is a phenomenon that occurs when a source flux at the detector is so high that there is a non-negligible possibility that two or more X-ray photons deposit charge packets in a single pixel close enough in time so that their signals interfere with each other. Pile-up phenomenon are of two general types, which result in somewhat different effects. In the first type, the two or more events are separated by sufficient time so that they are recognized as distinct events, but the signals overlap so that the precision of the measurement of the energy of the later arriving X-ray or X-rays is degraded. This type of pile-up results in a degradation of the energy resolution of the system. In the second type of pile-up, the two or more events arrive close enough in time so that the system is not able to resolve them as distinct events. In such a case, these events are recognized as one single event having the sum of their energies and the events are shifted in the spectrum to higher energies. In addition, pile-up leads to a more or less pronounced depression of counts in high X-ray flux, resulting in detector quantum efficiency (DQE) loss.

This pile-up may lead to detector saturation, which occurs at relatively low X-ray flux level thresholds in direct conversion sensors. Above these flux levels, the reduced detector response cannot be accurately compensated or corrected, and has degraded dose utilization that leads to loss of imaging information and results in noise and artifacts in X-ray projection and CT images. In particular, photon counting, direct conversion detectors saturate due to the intrinsic charge collection time (i.e., dead time) associated with each X-ray photon event. Saturation will occur due to pulse pile-up when X-ray photon absorption rate for each pixel is on the order of the inverse of this charge collection time.

PCCT imaging systems typically have one or more energy bins that are each determined by a comparator that typically is part of a readout of a data acquisition system (DAS). For a one-bin system, typically one energy threshold of the comparator is set to an energy value that is high enough such that there are few or no false noise counts, but low enough such that there is little loss of signal X-rays in the readout process. Such a system is subject to statistical error and bias due to the pile-up of multiple energy events, as described.

A system having many energy bins may be formed with multiple comparators in the readout DAS. Each comparator may be set to trigger for photons above a set level of energy that results in accumulation on a register of the number of photons above a corresponding X-ray energy level. The bin counts may be weighted and added together to form a system output having specific information content appropriate for an imaging system. However, like a one-bin system, a multiple bin system is subject to degradation due to pile-up, resulting in DQE loss. The mean pile-up of bin counts may be corrected, but with a loss of statistical accuracy. The signal-to-noise ratio (SNR) may be used to assess the weighted sums for a system output.

The sensors of a PCCT detector may be configured as a plurality of sensor segments within a sensor array, where the sensor segments are oriented in a direction of incoming X-rays. The sensor segments are used to prevent or account for pile-up behavior at the detector. The number of segments may be minimized to conserve channels to an application-specific integrated circuit (ASIC) electrically coupled to the sensor array, for analog/digital (A/D) conversion and readout. By having fewer channels, an amount of heat produced by the sensor array and a cost of the sensor array may be reduced. However, a defect may be generated in a segment of a sensor array, for example, due to high leakage current. If a defect is generated in a segment of a sensor array at a center of the detector, an efficiency of the sensor array may be reduced and image artefacts may be generated, to an extent that renders the sensor array unusable. If several segments within a sensor array are unusable, the sensor array may be rendered totally unusable. Thus, a challenge with PCCT is how to achieve a higher yield associated with more segments, while simultaneously benefitting from the decreased cost and heat of having fewer segments.

To increase a robustness of a sensor to defects without increasing a number of segments, systems and methods are proposed herein to subdivide the segments into sub-segments, where each sub-segment of a segment may be connected individually to an ASIC of the PCCT imaging system. Thus, when sub-segment becomes defective, the defective sub-segment may be isolated from the ASIC, while the non-defective sub-segments continue to be connected to the ASIC. In this way, less data may be lost as a result of a defect, resulting in a reconstructed image of a higher quality.

Figure 2:
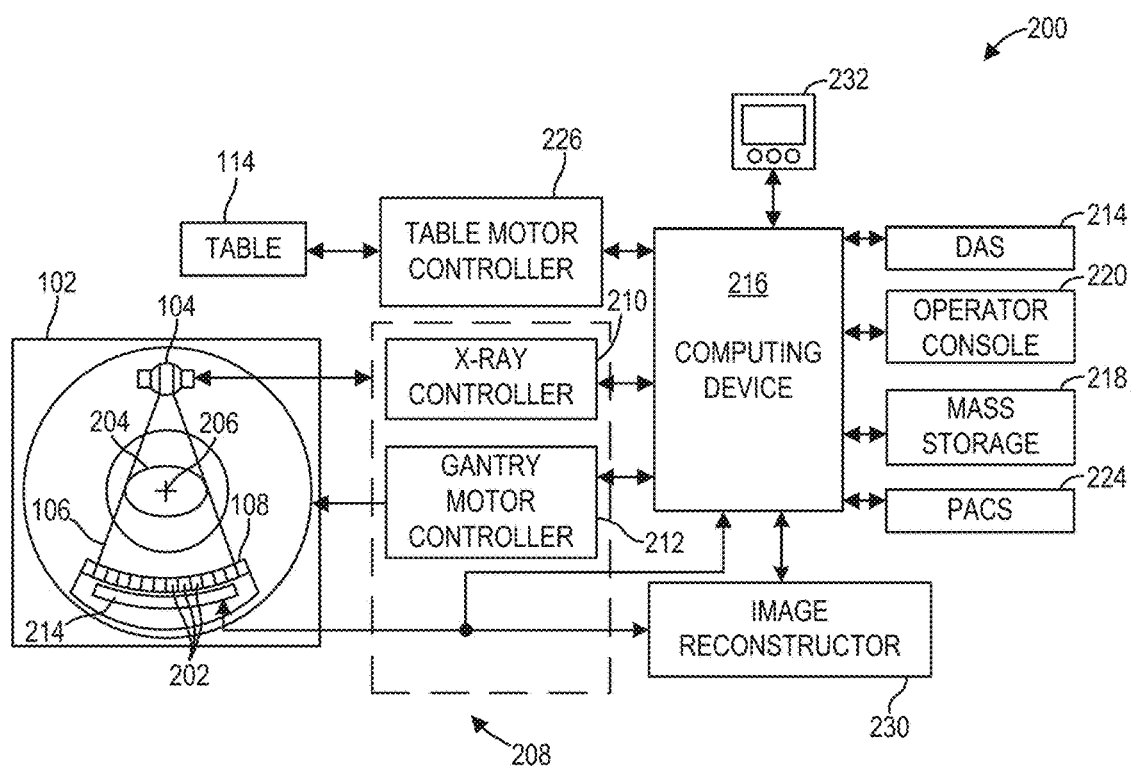
FIG. 2 shows a block schematic diagram of an exemplary CT imaging system, in accordance with one or more embodiments of the present disclosure.
Figure 3B:
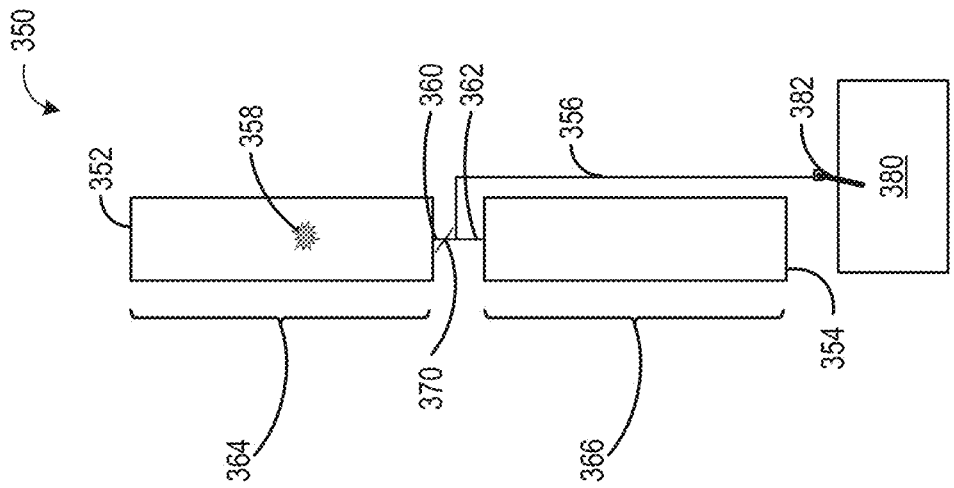
FIG. 3B is a schematic diagram indicating a defective sub-segment of a segment of a sensor array of a photon counting detector of a PCCT imaging system, where the defective sub-segment is isolated from an ASIC of the detector, in accordance with one or more embodiments of the present disclosure.
Figure 3A:
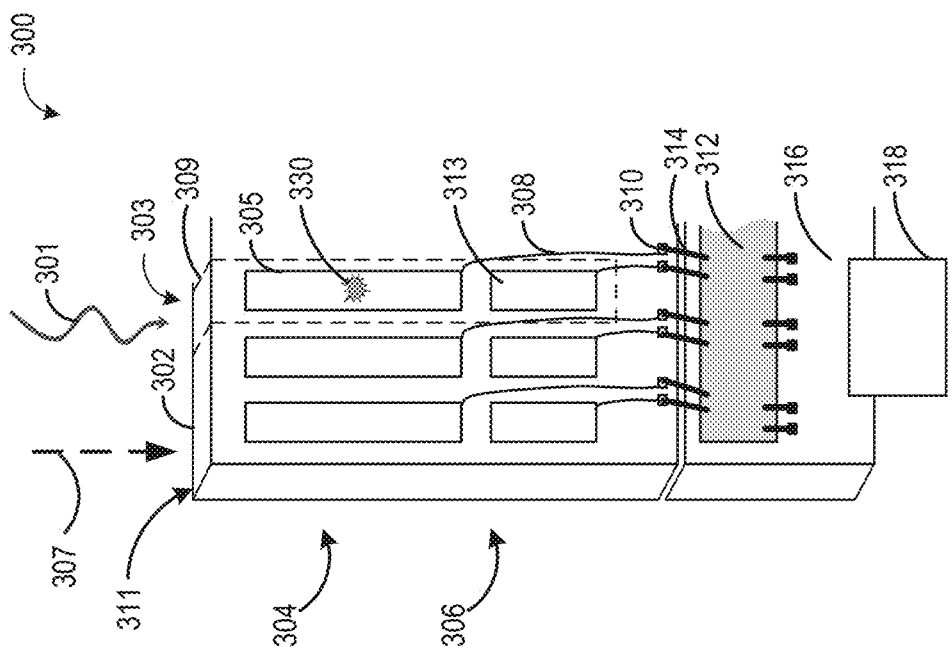
FIG. 3A is a schematic diagram of a sensor array of a photon counting detector of a PCCT imaging system, as prior art.
Figures 4A, 4B:
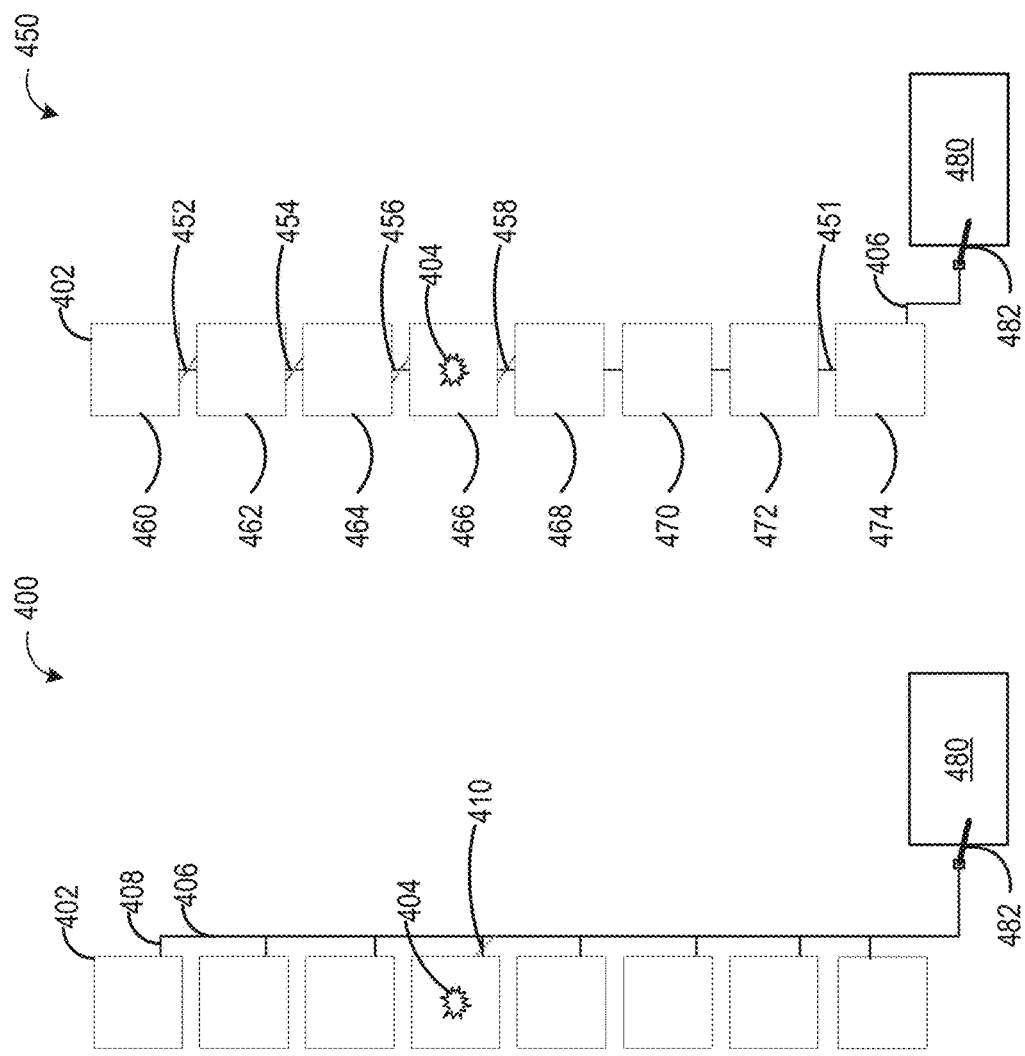
FIG. 4A is a schematic diagram showing a configuration of sub-segments of a segment of a sensor array of a PCCT imaging system, in accordance with one or more embodiments of the present disclosure.
FIG. 4B is a schematic diagram showing a first alternative configuration of sub-segments of a segment of a sensor array of a PCCT imaging system, in accordance with one or more embodiments of the present disclosure.
Figure 7:
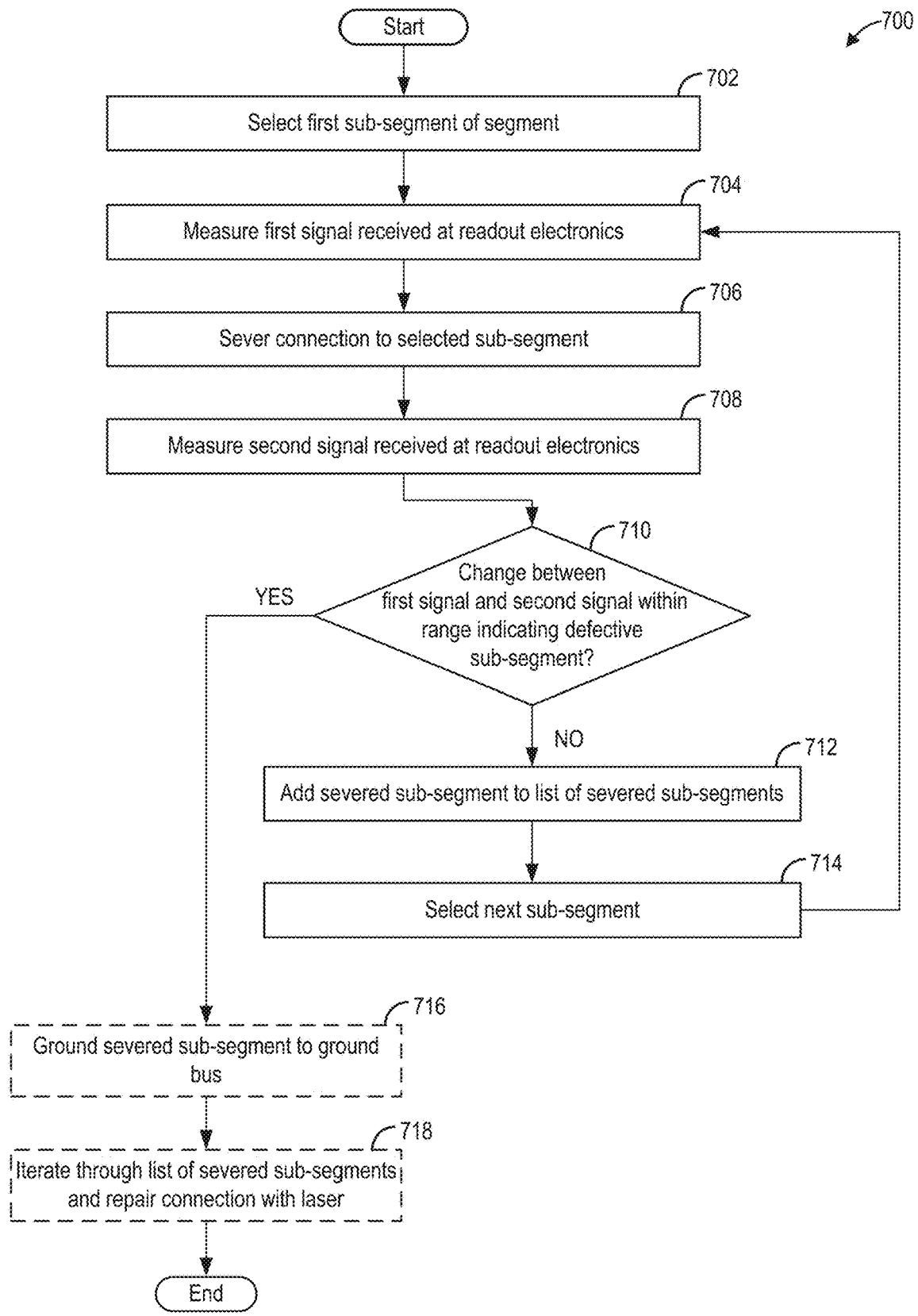
FIG. 7 is a flowchart illustrating an exemplary method for determining a location of a defective sub-segment of a segment of a sensor array of a PCCT detector by iteratively severing connections between a plurality of sub-segments of the segment and an ASIC of the sensor array, in accordance with one or more embodiments of the present disclosure.
Figure 8:
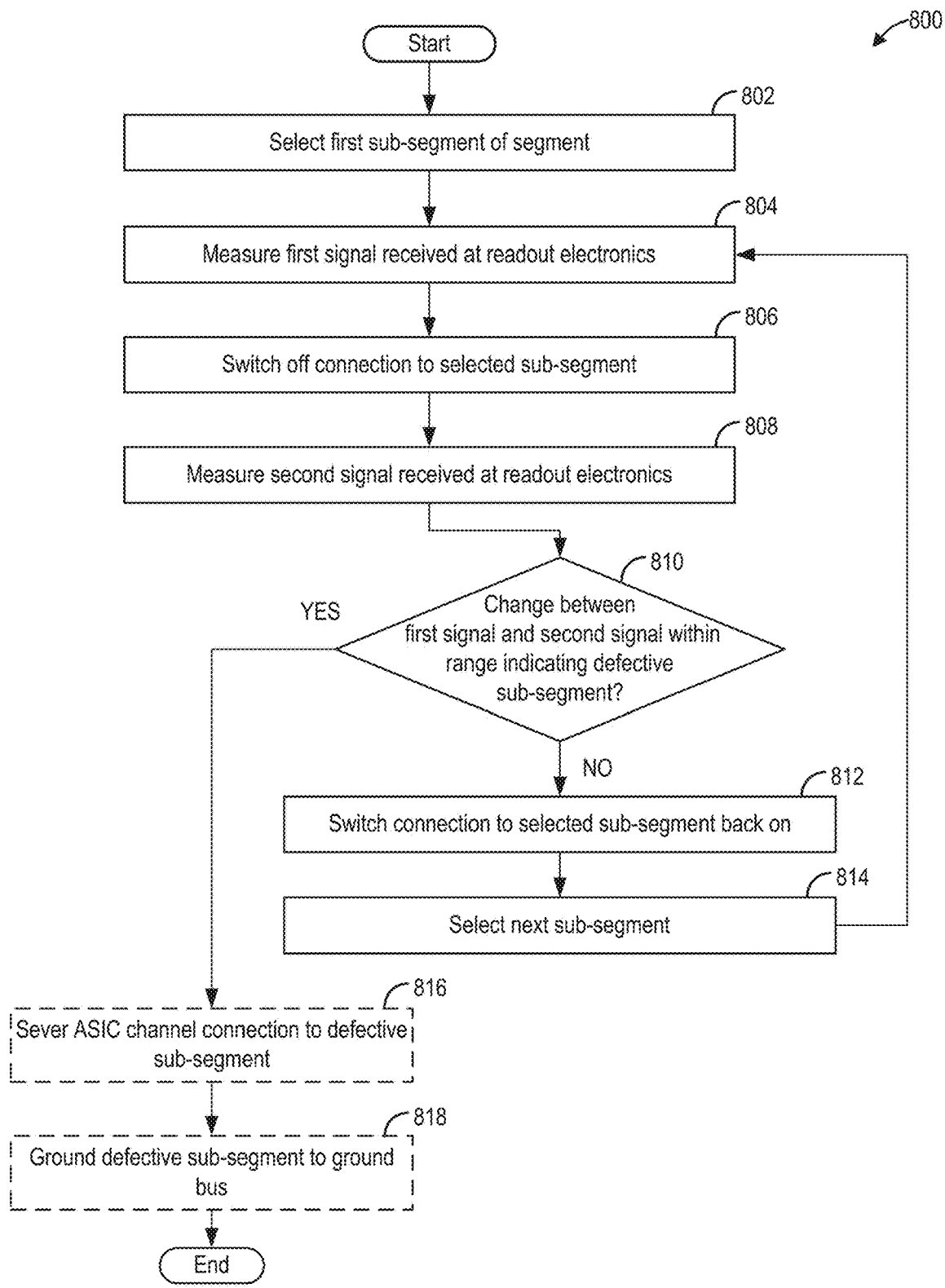
FIG. 8 is a flowchart illustrating an exemplary method for determining a location of a defective sub-segment of a segment of a sensor array of a PCCT detector by iteratively switching off connections between a plurality of sub-segments of the segment and an ASIC of the sensor array, in accordance with one or more embodiments of the present disclosure.

An example of a PCCT imaging system that may be used to perform contrast scans in accordance with the present techniques is provided in FIGS. 1 and 2. FIG. 3A shows an example photon counting detector element of the PCCT imaging system, where photons of X-rays directed at a subject by an X-ray source are detected by a sensor array of the detector element. If a defect occurs in a segment of the sensor array, the sensor array may be rendered unusable. If the segment is divided into sub-segments, as shown in FIG. 3B, a connection between a defective sub-segment and an ASIC of the PCCT imaging system may be severed and thus isolated from the readout electronics, without affecting a photon count of a non-defective sub-segment, whereby the sensor array may not be rendered unusable. A plurality of sub-segments may be connected to the ASIC individually, as shown in FIG. 4A, or connected in series, as shown in FIG. 4B. If a connection between a defective sub-segment and an ASIC of the PCCT imaging system is severed, the defective sub-segment may be grounded, as shown in FIG. 5. The sub-segments may also be connected to the ASIC or other readout electronics via switches, which may be used to both identify and isolate a defective sub-segment, as shown in a first configuration in FIG. 6A and a second configuration in FIG. 6B. FIG. 7 illustrates a first method for identifying and isolating a defective sub-segment by severing a connection to the readout electronics, and FIG. 8 illustrates a second method for identifying and isolating a defective sub-segment using switches.

FIG. 1 illustrates an exemplary CT system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one X-ray source 104 configured to project a beam of X-ray radiation 106 (see FIG. 2) for use in imaging the subject 112 laying on a table 114. Specifically, the X-ray source 104 is configured to project the X-ray radiation beams 106 towards a detector array 108 positioned on the opposite side of the gantry 102. Although FIG. 1 depicts a single X-ray source 104, in certain embodiments, multiple X-ray sources and detectors may be employed to project a plurality of X-ray radiation beams for acquiring projection data at different energy levels corresponding to the patient. In some embodiments, the X-ray source 104 may enable dual-energy gemstone spectral imaging (GSI) by rapid peak kilovoltage (kVp) switching. In some embodiments, the X-ray detector employed is a photon counting detector which is capable of differentiating X-ray photons of different energies. In other embodiments, two sets of X-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 including one or more processors configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, an X-ray source projects a cone-shaped X-ray radiation beam which is collimated to lie within an X-Y-Z plane of a Cartesian coordinate system and generally referred to as an "imaging plane." The X-ray radiation beam passes through an object being imaged, such as the patient or subject. The X-ray radiation beam, after being attenuated by the object, impinges upon an array of detector elements. The intensity of the attenuated X-ray radiation beam received at the detector array is dependent upon the attenuation of an X-ray radiation beam by the object. Each detector element of the array produces a separate electrical signal that is a measurement of the X-ray beam attenuation at the detector location. The attenuation measurements from all the detector elements are acquired separately to produce a transmission profile.

In some CT systems, the X-ray source and the detector array are rotated with a gantry within the imaging plane and around the object to be imaged such that an angle at which the X-ray beam intersects the object constantly changes. A group of X-ray radiation attenuation measurements, e.g., projection data, from the detector array at one gantry angle is referred to as a "view." A "scan" of the object includes a set of views made at different gantry angles, or view angles, during one revolution of the X-ray source and detector.

The X-ray source 104 includes an anode and a cathode. Electrons emitted by the cathode (e.g., resulting from energization of the cathode) may be intercepted by a target arranged at or near the anode. Electrons intercepted by the target may release energy in the form of X-rays, with the X-rays being directed toward the detector array 108. An area of the target surface that receives the electrons from the cathode and forms the emitted X-rays may be referred to herein as a "focal spot." The emitted X-rays may be focused on a portion of the scanned subject 204, at an "effective focal spot". A size of the effective focal spot may depend on an angle of the actual focal spot (e.g., on the target surface). For example, a small effective focal spot may be desirable when scanning a small area, while a large effective focal spot may be desirable when scanning a larger area.

In some embodiments, an X-ray generation system including the X-ray source 104 may move and/or shape the focal spot. For example, the X-ray generation system may increase or decrease a size of the focal spot. Additionally, in some embodiments, the X-ray generation system may generate a composite focal spot, where the composite focal spot is combination of two or more discreet focal spots. For example, two discreet focal spots located apart from each other may be combined to produce a single, composite focal spot. Composite focal spots are described in greater detail below in reference to FIGS. 3-9.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the X-ray radiation beam 106 (see FIG. 2) that pass through the subject 204 (such as a patient) to acquire corresponding projection data. In some embodiments, the detector array 108 may be fabricated in a multi-slice configuration including the plurality of rows of cells or detector elements 202, where one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the X-ray source 104 and the detector array 108 rotate, the detector array 108 collects data of the attenuated X-ray beams. The data collected by the detector array 108 undergoes pre-processing and calibration to condition the data to represent the line integrals of the attenuation coefficients of the scanned subject 204. The processed data are commonly called projections. In some examples, the individual detectors or detector elements 202 of the detector array 108 may include photon counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a 3D volumetric image of the basis material, for example, bone, soft tissue, and/or contrast agent, in the imaged volume.

Once reconstructed, the basis material image produced by the imaging system 200 reveals internal features of the subject 204, expressed in the densities of two or more basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the X-ray source 104. In certain embodiments, the control mechanism 208 further includes an X-ray controller 210 configured to provide power and timing signals to the X-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The data sampled and digitized by the DAS 214 is transmitted to a computer or computing device 216 including one or more processors. In one example, the computing device 216 stores the data in a storage device or mass storage 218. The storage device 218, for example, may be any type of non-transitory memory and may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the X-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized X-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

Referring now to FIG. 3A, a partial view of a photon counting detector element 300 of a PCCT imaging system is shown. Photon counting detector element 300 may be a non-limiting embodiment of a detector element 202 of FIG. 2, where a plurality of rows of detector elements 300 may be arranged in a parallel configuration to form a detector array (e.g., detector array 108) for acquiring the projection data, as described above.

Photon counting detector element 300 includes a sensor array 302, which may be electronically coupled to a printed circuit board (PCB) 316. PCB 316 includes a connection 318 to readout electronics of the detector element 300. An application-specific integrated circuit (ASIC) 312 may be mounted on PCB 316, which, along with the readout electronics, forms part of a DAS of the PCCT imaging system (e.g., DAS 214).

In various embodiments, sensor array 302 may be embedded in a chip made of a semiconductor material, such as silicon. A width of the chip may be one pixel, at an edge 311 of sensor array 302. A plurality of sensors may be embedded along a surface of the chip and extending along a length of the chip. Sensor array 302 may be configured to count photons impacting edge 311 of sensor array 302. Specifically, for each pixel 309 along edge 311, one or more sensor segments 305 may be embedded in a column 303 extending below each pixel 309, oriented in a direction 307 of incoming X-ray beams 301 (e.g., vertically in FIG. 3A). Each sensor segment 305 of each column 303 may have a width across the surface of sensor array 302 of approximately one pixel, corresponding to a pixel 309 at edge 311 corresponding to a relevant column 303. Each sensor segment 305 of each column 303 may count a number of photons of an incoming X-ray beam 301 impacting edge 311 at a corresponding pixel 309.

In other words, each column 303 may include a plurality of segments 305 stacked vertically in the column 303 in the direction 307. For example, each (vertically depicted) column 303 may include a first segment at a first vertical position 304; a second segment at a second vertical position 306, and so on. In the embodiment depicted in FIG. 3A, each column 303 includes two segments 305. In other embodiments, each column 303 may include three, four, or a different number of segments 305. A size of each segment 305 in a column 303 may be the same, or each segment 305 in a column 303 may be different. For example, a first segment 305 of a column 303 may be larger than a second segment 305 of the column 303. A third segment 305 of the column 303 may be smaller than the second segment 305 of the column 303.

Each segment 305 may be electrically coupled to ASIC 312 mounted on PCB 316. In various embodiments, each segment 305 of sensor array 302 may be electrically coupled to a sensor bond pad 310 of sensor array 302 via a PCCT sensor trace 308. Sensor bond pad 310 may be electrically coupled to ASIC 312 via a wire bond 314.

Each segment 305 may detect a number of incoming photons in an X-ray beam 301. As the X-ray beam 301 impacts sensor array 302 at a pixel 309, the X-ray beam 301 may pass through a plurality of stacked segments 305 of a corresponding column 303. As the X-ray beam 301 passes through each stacked segment 305 of the column 303, a number of photons included in the X-ray beam 301 may be detected at the segment 305.

For example, an exemplary X-ray beam 301 may enter a first segment 305 in the first vertical position 304 of the column 303, and the first segment 305 may detect a first number of photons of the exemplary X-ray beam 301. The first number of photons may be less than a total number of photons of the exemplary X-ray beam 301, where a second number of the total number of photons may pass through the first segment 305 undetected. The second number of (undetected) photons of the exemplary X-ray beam 301 passing through the first segment 305 may then enter a second segment 305 at the second vertical position 306 of the column 303. The second segment 305 may detect a third number of photons of the exemplary X-ray beam 301. The third number of photons may be less than the second number of photons, where a fourth number of photons may pass through the second segment 305 undetected. The fourth number of photons of the exemplary X-ray beam 301 passing through the second segment 305 may then enter a third segment 305 at a third vertical position of the column 303, and so on. Thus, the total number of detected photons of the exemplary X-ray beam 301 may be estimated by summing the number of photons detected by each vertically stacked segment 305 of the column 303.

The number of photons detected at each vertically stacked segment 305 of the column 303 may vary. For example, in some cases, all of the photons in the exemplary X-ray beam 301 may be detected by the first segment 305, and none of the photons in exemplary X-ray beam 301 may be detected by the second segment 305. In other cases, a large percentage of the photons in the exemplary X-ray beam 301 may be detected by the first segment 305, and a smaller percentage of the photons in exemplary X-ray beam 301 may be detected at the second segment 305, an even smaller percentage of the photons in exemplary X-ray beam 301 may be detected at the third segment 305, and so on. Some photons of the exemplary X-ray beam 301 may not be detected at any of the segments 305 of the column 303, where the total number of detected photons may not be equal to the total number of photons of the exemplary X-ray beam 301.

When a photon hits a segment 305, an analog electrical signal is generated that is transmitted to ASIC 312 via sensor trace 308 and sensor bond pad 310, where the analog electrical signal is proportional to an amount of energy of the photon. ASIC 312 may convert the analog electrical signal to a digital signal by counting the occurrence of the photon hit in a counter. Furthermore, the ASIC may discern the energy deposited by the photon by comparing the amount of electrical signal to one or more pre-established thresholds. Specifically, ASIC 312 may include a plurality of comparators, where each comparator of the plurality of comparators outputs a trigger signal that causes a corresponding digital counter to increment by one when the analog signal exceeds a signal level threshold associated with the comparator. Each comparator of the plurality of comparators may have a different signal level threshold. For example, ASIC 312 may include a first comparator with a first signal level threshold; a second comparator with a second signal level threshold, the second signal level threshold higher than the first signal level threshold; a third comparator with a third signal level threshold, the third signal level threshold higher than the second signal level threshold; and so on, up to a maximum energy level of a spectrum of photons. The differences between pairs of thresholds define energy ranges or bins. Thus, the number of photons whose energies fall within each bin may be recorded by the ASIC. These numbers of photon counts may be transmitted by the ASIC to the PCB via connection 318 to be used for image reconstruction. Alternatively, the ASIC may first perform additional operations on the numerical count information, such as summing together the individual photon counts from the bins within a given column to produce a total number of photon counts.

An advantage of including a plurality of segments in each column 303 is that pile-up behavior may be more accurately accounted for. X-rays are absorbed throughout a depth of the semiconductor material (e.g., silicon), without regard for how it is divided up into segments. Each segment 305 acts as an independent sensing element capable of producing signals from an X-ray that is absorbed in it. As a result, each segment 305 counts X-rays that are absorbed within an area of the semiconductor material associated with the segment 305, while other X-rays may not be absorbed and pass through the segment 305. Since each segment 305 is connected to its own counting channel circuit in the ASIC, the total number of X-ray counts are spread across multiple channels. Each channel can thereby more easily keep up with an absorption rate.

A segment 305 forming part of a pixel 309 may develop a defect 330, for example, due to damage in manufacturing, resulting in undesirable behavior, such as high leakage current. It is sometimes possible to disable defective segment 305, or ignore the data produced by defective segment 305. If the other segments comprising pixel 309 are not defective and are not disabled or ignored, then pixel 309 can still provide a measurement of incident X-rays 301, but with a reduced detection efficiency. However, if detector element 300 includes a defective segment 305 forming part of pixel 309, and detector element 300 is at a center of a detector array (e.g., detector array 108 of FIG. 1), reducing the detection efficiency of detector element pixel 309 may cause image artefacts to be generated, to an extent that may render detector element 300 unusable at the center of the detector array. If several segments 305 within sensor array 302 are unusable, detector element 300 may be rendered totally unusable at any position within the detector array. For example, if the total photon count at the column 303 is based on a sum of a first segment 305 and a second segment 313 of the column 303, and defect 330 occurs in the first segment 305, then the first segment must be disabled. As a result, a detection efficiency of the column is reduced. For example, if 30% of the expected photon counts are generated in a first segment, and the first segment must be disabled because of a defect, the overall detection efficiency of the column may be reduced by 30%. The number of photon counts from any column is subject to shot noise, which is the statistical variability associated with counting a discrete number of events. The relative amount of shot noise depends on the total detection efficiency. The column with reduced detection efficiency therefore produces degraded data with more noise. In an extreme case where all the segments in the column are disabled, the detection efficiency is zero. In this case, an estimated value must be supplied to substitute for the missing data from the column. This is often done by interpolating or otherwise averaging values from neighboring columns. However, this process is imperfect, and artifacts can result in certain circumstances.

To address a sensitivity of sensor array 302 to one or more defects 330, the inventors herein propose to divide some or all segments 305 into a plurality of sub-segments, where each sub-segment includes a diode that counts photons at the sub-segment. Thus, disabling one defective sub-segment may not effect a photon count at other sub-segments of a segment 305, and a greater fraction of the segment's detection efficiency may be preserved.

FIG. 3B shows a divided segment 350 of a sensor array, such as sensor array 302 of FIG. 3A, where divided segment 350 includes a first sub-segment 352 and a second sub-segment 354. First sub-segment 352 and second sub-segment 354 may have a width across the surface of the sensor array equal to a width of divided segment 350 (e.g., the width of segment 305). First sub-segment 352 and second sub-segment 354 may also have a thickness (e.g., depth) equal to a thickness of divided segment 350. A first length 364 of first sub-segment 352 and a second length 366 of second sub-segment 354 may add up to approximately a length of divided segment 350. In some embodiments, first length 364 may be the same as second length 366. In other embodiments, first length 364 may be different from second length 366. For example, second length 366 may be shorter than first length 364, or second length 366 may be longer than first length 364. Accordingly, volumes of semiconductor material of first sub-segment 352 and second sub-segment 354 may be the same, or the volumes may be different.

A probability of an X-ray's absorption is not uniform in depth, where more X-rays are absorbed near the top of the sensor array and fewer X-rays are absorbed at the bottom of the sensor array. If the sub-segments are the same size, a top sub-segment will count more of the x-rays, and a bottom sub-segment will count less of the X-rays. As a result, it may be desirable to use smaller sub-segments near the top of the sensor array, and larger sub-segments at the bottom of the sensor array, such that the number of X-rays absorbed in the top and bottom sub-segments are approximately the same. If the number of X-rays absorbed in the top and bottom sub-segments are approximately the same, an impact on the detection efficiency of disabling the top sub-segment may be the same as an impact of disabling the bottom sub-segment.

A total photon count at divided segment 350 is a sum of a first number of photon counts registered at first sub-segment 352, and a second number of photon counts registered at second sub-segment 354. First sub-segment 352 and second sub-segment 354 are electrically coupled to a channel 382 of an ASIC 380 (e.g., ASIC 312) via a shared trace 356. In FIG. 3B, shared trace 356 is configured such that ASIC 380 may receive electrical signals from first sub-segment 352 via a first connection 360 to shared trace 356, and ASIC 380 may receive electrical signals from second sub-segment 354 via a second connection 362 to shared trace 356. The electrical signal from first sub-segment 352 may be combined with the electrical signal from second sub-segment 354, and a total photon count for divided segment 350 may be calculated based on the combined electrical signals on channel 382. In some embodiments, ASIC 380 may be a single channel ASIC, and in other embodiments, ASIC 380 may be a multi-channel ASIC, where additional channels may be included at ASIC 380 (e.g., for other divided segments).

The location of a defect 358 may be determined to be in sub-segment 352. For example, the defect may be a site of damage to the sub-segment that creates a partial connection between neighboring segments, such as a short circuit. The location of the defect may determined in various ways. In one embodiment, the damage site may be determined using an Electron Beam Induced Current (EBIC). In this method, an electron beam is scanned over an area within and around the sub-segment, injecting a charge at each position. The electrical current, being a total of the sub-segments of each segment, is monitored in some or all of the segments. When the electron beam is over a non-defective position in a sub-segment, electrical current is collected only from the corresponding segment, and no current is collected from any other segment. When the electron beam is at the position of the defect, the current can reach also reach the neighboring segment because of the partial connection between them. Thus, the presence of a signal in both segments at the same time may indicate that the defect is located at the position of the electron beam.

In another embodiment, the defect may be located using thermal imaging, where a thermal camera with a high degree of sensitivity may be used to image small temperature increases due to localized leakage. In other embodiments, defect 358 may be detected based on the total photon count, where if the total photon count is below a threshold photon count, it may be inferred that defect 358 is present in sub-segment 352. For example, the total photon count may be compared to a photon count of one or more neighboring divided segments (e.g., sub-segment 354), or to a historical photon count of segment 350.

In various embodiments, if defect 358 is detected in first sub-segment 352, first sub-segment 352 may be isolated from ASIC 380 by severing first connection 360 at a position 370. For example, first connection 360 may be severed by a laser. Once first connection 360 is severed at position 370, ASIC 380 may receive the electrical signal from the second sub-segment 354, and ASIC 380 may not receive an electrical signal from first sub-segment 352. As a result of not receiving the electrical signal from first sub-segment 352, the number of photon counts produced in first sub-segment 352 determined by ASIC 380 may be zero. However, because photon counts may still be produced from second sub-segment 354, the total efficiency of photon counting for divided segment 350 is greater than zero, and the sensor array may still be usable. Thus, by dividing a segment into two sub-segments, a robustness of the segment to defects may be increased, and a quality of an image reconstructed based on the photon counts from the two sub-segments may be increased.

In other words, if the segment were not divided into separate sub-segments it would be necessary to disable channel 382 to ASIC 380 entirely and the counts from subsegments 352 and 354 would all be lost. In various embodiments, channel 382 may be disabled by programming ASIC 380 to disconnect a measurement circuit of channel 382 from the trace 356, and connect trace 356 to ground (or in general to a constant voltage available inside the ASIC). By severing the connection 360 to sub-segment 352 having the defect 358, channel 382 to ASIC 380 may remain enabled, and x-ray counts produced in sub-segment 354 will still be measured.

A sensitivity of a sensor to defects in segments of the sensor array may depend on a number of segments of a divided segment. In FIG. 3B, two segments are included in divided segment 350, whereby a loss of first sub-segment 352 may have a substantial impact on the total photon count. To make divided segment 350 more robust and less sensitive to defects, divided segment 350 may be divided into a greater number of sub-segments, where each sub-segment of the greater number of sub-segments may be smaller than the first sub-segment 352 and/or second sub-segment 354.

FIG. 4A shows a configuration of sub-segments of a divided segment 400 of a sensor array, such as sensor array 302 of FIG. 3A, where divided segment 400 includes a plurality of sub-segments 402. In some embodiments, each sub-segment 402 may be the same size, while in other embodiments, each sub-segment 402 may be a different size. For example, a first sub-segment of divided segment 400 may have a first size; a second sub-segment of divided segment 400 may have a second size, which may be larger or smaller than the first size; a third sub-segment of divided segment 400 may have a third size, which may be larger or smaller than either or both of the first size and the second size; and so on.

A total photon count at divided segment 400 may be a sum of photon counts for each sub-segment 402 of divided segment 400. Each sub-segment 402 is electrically coupled to a channel 482 of an ASIC 480 (e.g., channel 382 of ASIC 380) via a shared trace 406. In FIG. 4A, shared trace 406 is configured such that ASIC 480 may receive electrical signals through channel 482 from each sub-segment 402 via an individual connection 408 to shared trace 406. Electrical signals from each sub-segment 402 may be combined and converted into a total photon count for divided segment 400 by ASIC 480.

A defect 404 may be discovered in a sub-segment 402, as described above in reference to FIG. 3B. However, a disadvantage of having a plurality of sub-segments connected to ASIC 480 via shared trace 406 is that it may be difficult to detect which sub-segment 402 is defective.

One method for determining which sub-segment 402 has a defect, as described in greater detail below in reference to FIG. 7, is to iterate through each sub-segment 402, sever its corresponding individual connection 408 to shared trace 406, and compare the total photon count before and after severing the corresponding individual connection 408. Alternatively, a leakage of electricity caused by the defect may be estimated or measured before and after severing the corresponding individual connection 408 in a different manner, and a defective sub-segment may be a severed sub-segment that eliminates (e.g., substantially reduces) the leakage.

After the defective sub-segment 402 has been determined, severed individual connections 408 to non-defective sub-segments 402 may be repaired, to restore the functionality of the non-defective sub-segments 402. For example, the severed individual connections 408 may be repaired by laser welding, where severed portions of each severed individual connection 408 are fused together with spot welds formed with the application of a laser.

Once the individual connection 408 to the defective sub-segment has been severed (e.g., at position 410), ASIC 480 may receive electrical signals from the other sub-segments 402, and not receive an electrical signal from the severed sub-segment 402. As a result of not receiving the electrical signal from the severed sub-segment 402, the photon count for the severed sub-segment 402 determined by ASIC 480 may be zero. However, because the other sub-segments 402 will still produce photon counts, the total photon count for divided segment 400 may be close to the original photon count prior to severing the connection to the defective segment, whereby the sensor array may still be usable. Thus, by dividing a segment into a plurality of sub-segments, a robustness of the divided segment to defects may be increased, and a quality of an image reconstructed based on the photon counts from the sub-segments may be increased.

FIG. 4B shows a first alternative configuration 450 of the plurality of sub-segments 402 of divided segment 400. In first alternative configuration 450, each sub-segment 402 is not electrically coupled to ASIC 480 via shared trace 406. In FIG. 4B, each sub-segment 402 is electrically coupled to a neighboring sub-segment via a chained, serial connection 451, with a last connected sub-segment being electrically coupled to ASIC 480. In first alternative configuration 450, ASIC 480 may receive electrical signals from each sub-segment 402 via shared trace 406 coupled to the last connected sub-segment. The combined electrical signals from each sub-segment 402 may be converted to a total photon count for divided segment 400.

An advantage of first alternative configuration 450 over the configuration of divided segment 400 in FIG. 4A is that the overall length of traces is shorter, which reduces the capacitance compared to the configuration of FIG. 4A. Additional capacitance may cause an increase in noise, which is undesirable. However, a disadvantage of first alternative configuration 450 with respect to the configuration of divided segment 400 in FIG. 4A is that due to the serial connections between each sub-segment 402, one or more non-defective sub-segments 402 may be isolated from ASIC 480 as a result of severing the connection to a defective sub-segment 402.

For example, to determine which sub-segment 402 includes defect 404, a first serial connection 452 may be severed, where first serial connection 452 connects a first sub-segment 460 to a second sub-segment 462 of divided segment 400 (e.g., where first sub-segment 460 is the farthest sub-segment from ASIC 480). If a comparison of signals for divided segment 400 before and after severing first serial connection 452 indicate that defect 404 is in first sub-segment 460, then connection 452 may be maintained severed to permanently remove the defective sub-segment from divided segment 450. The photon counts at the remaining sub-segments 402 may still be transmitted to ASIC 480. If the comparison of signals for divided segment 400 before and after severing first serial connection 452 indicate that defect 404 is not in first sub-segment 460, a second serial connection 454 may be severed, where second serial connection 454 connects second sub-segment 462 to a third sub-segment 464 of divided segment 400. If a comparison of signals for divided segment 400 before and after severing second serial connection 454 indicate that defect 404 is in second sub-segment 462, then photon counts at the remaining sub-segments 402 may still be transmitted to ASIC 480. If the comparison of signals for divided segment 400 before and after severing second serial connection 454 indicate that defect 404 is not in second sub-segment 462, a third serial connection 456 may be severed, where third serial connection 454 connects third sub-segment 464 to a fourth sub-segment 466 of divided segment 400. In this way, the sub-segment 402 including defect 404 may be determined, and the defective sub-segment may be isolated from ASIC 480 by severing its serial connection at location 458. However, in first alternative configuration 450, serial connections 452, 454, and 456 may not be repaired, whereby ASIC 480 may receive photon counts from sub-segments 468, 470, 472, and 474 (which are between defective sub-segment 466 and ASIC 480), and not receive photon counts from sub-segments 460, 462, and 464 (which are separated from ASIC 480 by defective sub-segment 466).

FIG. 5 shows a second alternative configuration 500 of a plurality of sub-segments 502 arranged in a first divided segment 504 and a second divided segment 554, where sub-segments 502 may be similar to sub-segments 402 of divided segment 400 of FIG. 4A. In FIG. 5, a severed sub-segment 502 may be subsequently grounded to a ground terminal 501 via a ground line 512. When a connection between a sub-segment 502 and a conductor at a well-defined electric potential (e.g., an ASIC input node) is severed, the electric potential of the severed electrode is no longer fixed, and can vary depending on the movement of electrical charge in its neighborhood. Among other effects, this may cause the electric field in the neighborhood of the severed electrode to become non-uniform, which is undesirable. To avert this, any severed sub-segments 502 may be individually connected to ground line 512.

Divided segment 504 includes a first sub-segment 520 and a second sub-segment 522. Divided segment 554 includes a third sub-segment 524 and a fourth sub-segment 526. Second alternative configuration 500 includes a first shared trace 506 and a second shared trace 508, where sub-segments 520 and 522 of divided segment 504 are connected to a first channel 581 of an ASIC 580 via first shared trace 506, and sub-segments 524 and 526 of divided segment 554 are connected to a second channel 582 of ASIC 580 via second shared trace 508.

In other embodiments, a different number of sub-segments may be included in either or both of divided segment 504 and/or divided segment 554, which may be connected to one or more channels of ASIC 580 via a greater or lesser number of traces. For example, divided segment 504 may include three sub-segments are connected to ASIC 580 via first shared trace 506 and first channel 581, and divided segment 554 may include a different three sub-segments connected to ASIC 580 via second shared trace 508 and second channel 582. Alternatively, each sub-segment 502 of divided segment 504 or divided segment 554 may be connected to either ASIC 580 via first shared trace 506 and first channel 581, or via second shared trace 508 and second channel 582. It should be appreciated that the examples shown here are for illustrative purposes, and a greater or lesser number of traces and/or ASICs may be used, with a greater or lesser number of sub-segments connected to the greater or lesser number of traces and/or ASICs, without departing from the scope of this disclosure.

Divided segment 504 and first shared trace 506 are configured such that ASIC 580 may receive electrical signals at first channel 581 from sub-segment 520 via an individual connection 505 to shared trace 506, and from sub-segment 522 via an individual connection 507 to shared trace 506.

Similarly, divided segment 554 and second shared trace 508 are configured such that ASIC 580 may receive electrical signals at second channel 582 from sub-segment 524 via an individual connection 509 to shared trace 508, and from sub-segment 526 via an individual connection 511 to shared trace 508. At ASIC 580, the electrical signals from sub-segments 520 and 522 may be combined and converted into a total photon count for divided segment 504. For example, the total photon count at divided segment 504 may be the sum of a electrical signal at sub-segment 520 and a second electrical signal at sub-segment 522. The total photon count at divided segment 554 may be the sum of a third electrical signal at sub-segment 524 and a fourth electrical signal at sub-segment 526.

A defect 510 may be detected in sub-segment 526 of divided segment 554. In various embodiments, defect 510 may be detected by iteratively severing individual connections to each sub-segment of divided segment 554 and comparing total photon counts for divided segment 554 before and after severing, as described in greater detail below in reference to FIG. 7. For example, individual connection 509 may first be severed, to determine whether defect 510 is in sub-segment 524. If it is determined that defect 510 is not in sub-segment 524, individual connection 509 may be repaired, and individual connection 511 may be severed, to determine whether defect 510 is in sub-segment 526. As a result of repairing individual connection 509, electrical signals from sub-segment 524 may be received at ASIC 580 via second channel 582. Because sub-segments 520 and 522 are not included in divided segment 554, electrical signals from sub-segments 520 and 522 may be received at ASIC 580 via first channel 581. The electrical signals received at first channel 581 may be converted to photon counts and summed to determine a total photon count for divided segment 504, and the electrical signals received at second channel 582 (e.g., from sub-segment 524 but not from severed sub-segment 526) may be converted to photon counts and summed to determine a total photon count for divided segment 554

After severing individual connection 511, sub-segment 526 may be connected to ground line 512 via a new connection 514. By grounding severed sub-segment 526, the electric potential of severed sub-segment 526 may be fixed, thereby preventing an electric field in the neighborhood of severed sub-segment 526 from becoming non-uniform.

FIG. 6A shows a third alternative configuration 600 of a plurality of sub-segments 602 of a divided segment 604, similar to sub-segments 402 of divided segment 400 of FIGS. 4A and 4B, and sub-segments 502 of divided segment 504 of FIG. Divided segment 604 includes a first sub-segment 620, a second sub-segment 622, and a third sub-segment 624. Similar to FIG. 4A, each sub-segment is electrically coupled to an ASIC 680 via a shared trace 606. However, in FIG. 6A, first sub-segment 620 is connected to shared trace 606 via a first switch 605; second sub-segment 622 is connected to shared trace 606 via a second switch 607, and a third sub-segment 624 is connected to shared trace 606 via a third switch 609. First switch 605, second switch 607, and third switch 609 may be normally connected switches, where a default position of first switch 605, second switch 607, and third switch 609 allows a charge to pass from first sub-segment 620, second sub-segment 622, and third sub-segment 624 to the ASIC. For example, a transistor switch may be built into the sensor array, and a voltage may be applied to the transistor gate via built-in electronics or an externally applied voltage to cause the transistor switch to open, preventing charge from reaching the ASIC. Measurement of electrical signals for first sub-segment 620, second sub-segment 622, and third sub-segment 624 and a total photon count for divided segment 604 at ASIC 680 may be carried out as described above in reference to FIGS. 4A-5.

In third alternative configuration 600, first switch 605, second switch 607, and third switch 609 may be advantageously used to determine which sub-segment of divided segment 604 a defect 610 is in, without having to sever individual connections between sub-segments and ASIC 680.

For example, to determine which sub-segment 602 includes defect 610, first switch 605 may be adjusted from a closed state to an open state, thereby cutting first sub-segment 620 off from ASIC 680. In other words, opening first switch 605 may functionally accomplish the same purpose as severing an individual connection to first sub-segment 620 from ASIC 680. Thus, if a comparison of total electrical signals for divided segment 604 before and after opening first switch 605 indicate that defect 610 is in first sub-segment 620, then photon counts at sub-segments 622 and 624 may still be transmitted to ASIC 480, with a small signal loss. If the comparison of total electrical signal for divided segment 604 before and after opening first switch 605 indicate that defect 610 is not in first sub-segment 620, first switch 605 may be adjusted from the open position back to the closed position, thereby reconnecting first sub-segment 620 to ASIC 680. Second switch 607 may then be adjusted from a closed position to an open position, thereby cutting second sub-segment 622 off from ASIC 680.

It should be appreciated that while a calculation of photon counts from signals produced at various sub-segments is described herein as being performed by ASIC 680, in various embodiments, a different readout electronics (e.g., an external readout electronics used during testing and repair) may be substituted for ASIC 680 without departing from the scope of this disclosure.

If a comparison of signals for divided segment 604 before and after opening second switch 607 indicate that defect 610 is in second sub-segment 622, then signals at the remaining sub-segments 620 and 624 may still be transmitted to ASIC 480. If the comparison of signals for divided segment 604 before and after opening second switch 607 indicate that defect 610 is not in second sub-segment 622, second switch 607 may be adjusted from the open state back to the closed state, thereby reconnecting second sub-segment 622 to ASIC 680. Third switch 609 may then be adjusted from a closed state to an open state, thereby cutting third sub-segment 624 off from ASIC 680.

In this way, it may be determined that sub-segment 624 includes defect 610, and defective sub-segment 624 may be isolated from ASIC 680 by permanently switching off third switch 609, or by severing a connection between sub-segment 624 and ASIC 680 at position 630. In some embodiments, defective sub-segment 624 may be grounded after the connection to ASIC 680 is severed, as described above in reference to FIG. 5. By severing the connection between sub-segment 624 and ASIC 680, third switch 609 may not have to be maintained in the open position, resulting in a reduced consumption of energy. In addition to saving energy, if a trace to a defective sub-segment is severed, then no electronic circuit is required to maintain the open state. For example, the circuit could be external to the whole assembly, and used during the manufacturing testing process. If a trace to a defective sub-segment is severed, then the circuit may not be needed in a final assembly.

FIG. 6B shows a fourth alternative configuration 650 of two divided sub-segments, each with two sub-segments. A divided segment 654 includes a first sub-segment 652 and a second sub-segment 653, and a divided segment 655 includes a third sub-segment 660 and a fourth sub-segment 662. In fourth alternative configuration 650, sub-segments 652 and 653 are electrically coupled to ASIC 680 via a shared trace 668, where sub-segment 652 is connected to shared trace 668 via a first individual connection 656, and sub-segment 653 is connected to shared trace 668 via a second individual connection 664. Similarly, sub-segments 660 and 662 are electrically coupled to a ASIC 680 via a shared trace 670, where sub-segment 660 is connected to shared trace 670 via a third individual connection 658, and sub-segment 662 is connected to shared trace 670 via a fourth individual connection 666. A total photon count for divided segment 654 may be calculated at ASIC 680 based on a first signal received from first sub-segment 652 and a second signal received from second sub-segment 653, as described above in reference to FIGS. 4A-6A. A total photon count for divided segment 655 may be calculated based on a third signal received from second sub-segment 660 and a fourth signal received from fourth sub-segment 662.

Additionally, a first switch 657 may be positioned on first individual connection 656; a second switch 665 may be positioned on second individual connection 664; a third switch 659 may be positioned on third individual connection 658; and a fourth switch 667 may be positioned on fourth individual connection 666. In various embodiments, switches 657, 665, 659, and 667 may be transistors in a normally closed state. As in the third alternative configuration 600 of FIG. 6A, a defect 675 in one of the sub-segments (e.g., in first sub-segment 652) may be detected by adjusting one or more of switches 657, 665, 659, and 667, although in a different manner than in third alternative configuration 600. In FIG. 6B, a signal source 690 (such as a voltage source) is electrically coupled to a transistor gate of first switch 657 and a transistor gate of third switch 659 and a second signal source 692 is electrically coupled to a transistor gate of second switch 665 and a transistor gate of fourth switch 667. Thus, a voltage applied at signal source 690 may open the transistor gates to first switch 657 and third switch 659, such that no signal may be received at ASIC 680 from sub-segments 652 and 660. Similarly, a voltage applied at signal source 692 may open the transistor gates to second switch 665 and fourth switch 667, such that no signal may be received at ASIC 680 from sub-segments 653 and 662. The voltage may be applied via an electronic probe, for example, during testing and/or repairing of divided segments 654 and/or 655.

To determine the location of defect 675, sub-segments 652, 653, 660, and 662 may be iteratively isolated from the ASIC by adjusting first signal source 690 and second signal source 692. For example, a voltage may be applied to signal source 690 to open switches 657 and 659, thereby cutting sub-segments 652 and 660 off from ASIC 680. ASIC 680 receives a signal from sub-segment 653 at a first ASIC channel 681, which can be used to determine whether sub-segment 653 has a defect, and ASIC 680 receives a signal from sub-segment 662 at a second ASIC channel 682, which can be used to determine whether sub-segment 662 has a defect. If the signals for sub-segments 653 and 662 are within a range of expected signals, it may be inferred that sub-segments 653 and 662 are not defective. The voltage applied to signal source 690 may then be discontinued to close switches 657 and 659 (or a second voltage may be applied), thereby restoring connections between sub-segments 653 and 662 and ASIC 680. A voltage may then be applied to signal source 692 to open switches 665 and 667, thereby cutting sub-segments 653 and 662 off from ASIC 680. ASIC 680 receives a signal from sub-segment 652 at first ASIC channel 681, and ASIC 680 receives a signal from sub-segment 660 at second ASIC channel 682. As a result of defect 675, the signal for sub-segment 652 may not be within the range of expected signals, whereby it may be inferred that sub-segment 652 is defective.

Once it has been determined that defect 675 is in first sub-segment 652, first connection 656 may be severed (e.g., with a laser), permanently isolating sub-segment 652 from ASIC 680. After severing first connection 656, the total photon count for divided segment 654 at ASIC channel 681 of ASIC 680 may be equal to the photon count at second sub-segment 653. While the total photon count for divided segment 654 may be reduced as a result of severing first connection 656 between sub-segment 652 and ASIC 680, the total photon count for divided segment 654 may be close enough to an expected photon count that a quality of an image reconstructed using the total photon count for divided segment 654 may still be high. An advantage of fourth alternative configuration 650 over third alternative configuration 600 of FIG. 6A is that the presence of defects in more than one divided segment may be determined at the same time and with fewer individual applied signals, which may reduce a time to locate and cost to locate defects in divided segments.

It should be appreciated that while the figures included herein refer to various ASICs being connected to the sub-segments, an ASIC may not be included in a detector element until other components of the detector element have been assembled and tested. As connections may be severed and switches may be opened or closed during a testing phase carried out during manufacturing, in various embodiments, the ASIC may be replaced by an external or internal measurement circuit (e.g., a current meter) configured to measure a combined signal from a divided segment, where the combined signal comprises signals produced by a plurality of sub-segments of the divided segment (e.g., functionally similar to the ASIC). For example, the measurement circuit may a circuit external to the ASIC but internal to the PCCT detector, or the measurement circuit may be a separate measurement circuit temporarily connected to the divided segment during testing and/or repairing of the PCCT detector.

Referring now to FIG. 7, an example method 700 is shown for determining a location of a defective sub-segment of a segment of a sensor array of a PCCT detector by iteratively severing connections between a plurality of sub-segments of the segment and an ASIC of the sensor array, as briefly described in reference to FIG. 4A above. Method 700 is described in reference to the CT system 100 of FIG. 1 and/or the imaging system 200 of FIG. 2. Method 700 may be executed by a manufacturer of components of the PCCT detector, for example, during manufacturing, testing, or repairing of the PCCT detector. In various embodiments, method 700 may be executed upon detecting a defect in one or more sub-segments of a divided segment of the sensor array, such as sub-segments 402 of divided segment 400 of FIG. 4A. In other embodiments, method 700 may be alternatively or additionally performed periodically as a way to maintain the PCCT detector operating at maximally efficient conditions (e.g., to detect a degradation that arises during use of the PCCT detector. For example, a degradation may arise due to radiation damage, humidity damage, marginal leakage increasing over a threshold as noise in the system increases, or a different reason.

Method 700 begins at 702, where method 700 includes selecting a first sub-segment of a divided segment. The first sub-segment of the divided segment may be, for example, a closest sub-segment to the ASIC, or the first sub-segment of the divided segment may be a sub-segment located farthest from the ASIC, or a different sub-segment.

At 704, method 700 includes measuring a first signal received at readout electronics configured to measure a combined signal from sub-segments of the divided segment. Signals from each sub-segment of the divided segment may be combined at the readout electronics, whereby the first signal may be a total signal received at the readout electronics from all sub-segments of the divided segment. As described above, the readout electronics may be internal or external to the PCCT detector. In some embodiments, the first signal may be measured by the ASIC rather than a separate readout electronics.

At 706, method 700 includes severing a connection between the selected sub-segment and the readout electronics. In various embodiments, the connection may be an individual connection from the selected sub-segment to a shared trace leading to the readout electronics, where the shared trace may be coupled to other individual connections of other sub-segments of the divided segment. By severing the connection between the selected sub-segment and the readout electronics, a photon count for the selected sub-segment may not be calculated at the ASIC during scanning.

At 708, method 700 includes measuring a second signal received at the readout electronics. As with the first signal, the second signal may be measured by readout electronics of the ASIC, or readout electronics of a measurement circuit internal or external to the PCCT detector. Signals from each sub-segment may be combined at the readout electronics (or ASIC), whereby the second signal may be a total signal received at the readout electronics from all non-severed sub-segments of the divided segment. As a result of having severed the connection between the selected sub-segment and the readout electronics, the signal produced at the selected sub-segment is expected to be very small (e.g., a normal leakage current near zero).

At 710, method 700 includes determining whether a change between the first signal and the second signal is within a range that indicates that the selected sub-segment includes a defect. For example, if the change is above a threshold change, the change may be within the range indicating that the selected sub-segment includes a defect. For example, the defect may be caused by excess leakage current, or intermittent excess dark counts, both of which may generate a large, undesirable signal (e.g., excessive counts that should not be there). The large, undesirable signal may be within the range indicating that the selected sub-segment includes a defect, and a signal produced from a sub-segment not including a defect may not be within the range. In other embodiments, the range may cover a smaller-than-expected signal. For example, the defect may have a different cause, where the different cause produces a signal that is less than a signal expected from a sub-segment not including a defect. The smaller-than-expected signal may be within the range that indicates that the selected sub-segment includes a defect. In some embodiments, a plurality of ranges may be used, where if a signal is within one of the plurality of ranges, it may be inferred that the sub-segment is defective, and if the signal is not within any of the plurality of ranges, it may be inferred that the sub-segment is not defective.

In other embodiments, a different method may be used to determine whether the sub-segment is defective. For example, an EBIC may be used to detect excess leakage, or thermal imaging may be used to locate defects, as described above in reference to FIG. 3B.

If at 710 it is determined that the change between the first signal and the second signal is not within the range indicating that the sub-segment is defective, method 700 proceeds to 712. At 712, method 700 includes adding the selected sub-segment to a list of severed sub-segments. For example, the selected sub-segment may be added to a vector stored in a short-term memory of the PCCT imaging system. Method 700 proceeds to 714.

At 714, method 700 includes selecting a next sub-segment. In various embodiments, the next sub-segment is a neighboring sub-segment of the previously selected sub-segment. For example, the selected first sub-segment may be a closest sub-segment to the readout electronics (e.g., such as sub-segment 474 of FIG. 4B). A second selected sub-segment may be a next closest sub-segment to the readout electronics neighboring the first selected sub-segment (e.g., sub-segment 472 of FIG. 4B); a third selected sub-segment may be a next closest sub-segment to the readout electronics neighboring the second selected sub-segment (e.g., sub-segment 470 of FIG. 4B); and so on. Alternatively, the selected first sub-segment may be a sub-segment farthest from the readout electronics (e.g., such as sub-segment 460 of FIG. 4B). A second selected sub-segment may be a next farthest sub-segment to the readout electronics neighboring the first selected sub-segment (e.g., sub-segment 462 of FIG. 4B); a third selected sub-segment may be a next farthest sub-segment to the readout electronics neighboring the second selected sub-segment (e.g., sub-segment 464 of FIG. 4B); and so on.

Once a next sub-segment is selected, method 700 proceeds back to 704, where a new first signal is measured by the readout electronics.

Alternatively, if at 710 it is determined that the change between the first signal and the second signal is within the range indicating that the selected sub-segment is defective, method 700 proceeds to 716. At 716, method 700 may include grounding the severed sub-segment, for example, to a ground bus. For example, in some embodiments, the severed sub-segment may be grounded to a ground line of the ground bus, as described above in reference to FIG. 5.

At 718, method 700 may include iterating through the list of severed (non-defective) sub-segments, and for each severed sub-segment on the list of severed sub-segments, repairing the connection between the severed sub-segment and the ASIC. In various embodiments, the connection between the severed sub-segment and the ASIC may be repaired by laser welding. Method 700 ends.

Referring now to FIG. 8, an example method 800 is shown for determining a location of a defective sub-segment of a segment of a sensor array of a PCCT detector by iteratively switching off connections between a plurality of sub-segments of the segment and an ASIC of the sensor array, as briefly described in reference to FIG. 6A above. Method 800 is described in reference to the CT system 100 of FIG. 1 and/or the imaging system 200 of FIG. 2. Method 800 may be executed by a manufacturer of components of the PCCT detector, for example, during manufacturing, testing, or repairing of the PCCT detector. Method 800 may be executed upon detecting a defect in one or more sub-segments of a divided segment of the sensor array, such as sub-segments 602 of divided segment 604 of FIG. 6A.

Method 800 begins at 802, where method 800 includes selecting a first sub-segment of a divided segment. The first sub-segment of the divided segment may be, for example, the first sub-segment of the divided segment may be a closest sub-segment to the readout electronics, or the first sub-segment of the divided segment may be a sub-segment located farthest from the readout electronics.

At 804, method 800 includes measuring a first signal received at readout electronics configured to measure a combined signal from sub-segments of the divided segment. Signals from each sub-segment of the divided segment may be combined at the readout electronics, whereby the first signal may be a total signal received at the readout electronics from all sub-segments of the divided segment. As described above, the readout electronics may be internal or external to the PCCT detector. In some embodiments, the first signal may be measured by the ASIC rather than a separate readout electronics.

At 806, method 800 includes adjusting a switch coupled to an individual connection from the selected sub-segment to a shared trace (e.g., switch 609 coupled to shared trace 606 of FIG. 6A) leading to the readout electronics from a closed position to an open position, where the shared trace may be coupled to other individual connections of other sub-segments of the divided segment.

At 808, method 800 includes measuring a second signal received at the readout electronics. As with the first signal, the second signal may be measured by readout electronics of the ASIC, or readout electronics of a measurement circuit internal or external to the PCCT detector. Signals from each sub-segment may be combined at the readout electronics (or ASIC), whereby the second signal may be a total signal received at the readout electronics from all connected sub-segments of the divided segment. As a result of having switched off the connection between the selected sub-segment and the readout electronics, the signal produced at the selected sub-segment is expected to change.

At 810, method 800 includes determining whether a change between the first signal and the second signal is within a range indicating that the sub-segment is defective, as described above in reference to method 700. If at 810 it is determined that the change between the first signal and the second signal is not within the range indicating that the sub-segment is defective, it may be inferred that the selected sub-segment does not include a defect, whereby method 800 proceeds to 812. At 812, method 800 includes adjusting the switch coupled to the individual connection from the selected sub-segment to the shared trace leading to the readout electronics from the open position back to the closed position, thereby reconnecting the selected sub-segment with the readout electronics.

At 814, method 800 includes selecting a next sub-segment. In various embodiments, the next sub-segment is a neighboring sub-segment of the previously selected sub-segment. For example, the selected first sub-segment may be a closest sub-segment to the readout electronics. A second selected sub-segment may be a next closest sub-segment to the readout electronics; a third selected sub-segment may be a next closest sub-segment to the readout electronics may bring the second selected sub-segment; and so on. Once a next sub-segment is selected, method 800 proceeds back to 804, where a new first signal is measured.

Alternatively, if at 810 it is determined that the change between the first signal and the second signal is within the range indicating that the selected sub-segment is defective, method 800 proceeds to 816. At 816, method 800 includes severing the connection between the defective sub-segment and the readout electronics.

At 818, method 800 optionally includes grounding the severed sub-segment, for example, to a ground bus. For example, in some embodiments, the severed sub-segment may be grounded to a ground line of the ground bus, as described above in reference to FIG. 5. Method 800 ends.

Thus, methods and systems are proposed herein to repair a defective segment of a sensor array of a photon counting detector of a PCCT imaging system, by dividing a segment of a sensor array of the PCCT imaging system into a plurality of sub-segments, each of which is electrically coupled to an ASIC configured to calculate a photon count for the segment. A total photon count for the divided segment used for reconstructing an image may then be determined from the electrical signals produced by each sub-segment. By dividing the segment into sub-segments, a defect in the segment may be traced to a defective sub-segment. A connection between the defective sub-segment and the ASIC may then be severed to isolate the defective sub-segment. The technical effect of isolating a defective sub-segment of a segment, rather than a defective segment, is that a more accurate photon count may be measured for a pixel associated with the segment, resulting in a higher quality reconstructed image.

Various methods are presented for detecting a defect in a sub-segment, such as by comparing a signal from the segment received at readout electronics before and after severing or switching off a connection between a selected sub-segment and the readout electronics. If the signal prior to cutting off the connection is very different from the signal received after cutting off the connection, it may be inferred that the selected sub-segment is defective. Alternatively, if the signal received prior to cutting off the connection is not very different from the signal received after cutting off the connection, it may be inferred that the selected sub-segment is not defective. Once a sub-segment is determined to be defective, the sub-segment may be permanently disconnected from the ASIC by severing a connection between them with a laser. A permanently disconnected sub-segment may additionally be grounded.

The disclosure also provides support for a method for a photon counting computed tomography (PCCT) imaging system, the method comprising: dividing a segment of a sensor array of a photon counting detector of the PCCT imaging system into a plurality of sub-segments, wherein each sub-segment of the plurality of sub-segments is electrically coupled to a readout electronics, the readout electronics configured to calculate a photon count for the segment, generating a total photon count for the divided segment based on combined electrical signals produced at each sub-segment of the divided segment, and reconstructing an image based on the total photon count at the divided segment. In a first example of the method, the method further comprises: in response to detecting a defect in the segment: identifying a sub-segment in which the defect is located, repairing the segment by severing a connection between the defective sub-segment and the readout electronics, generating the total photon count for the divided segment based on combined electrical signals produced at each non-defective sub-segment of the divided segment, and reconstructing an image based on the total photon count. In a second example of the method, optionally including the first example, identifying the sub-segment in which the defect is located and repairing the segment by severing a connection between the defective sub-segment and the readout electronics is performed by a manufacturer of the sensor array during a testing and/or repairing stage. In a third example of the method, optionally including one or both of the first and second examples, the method further comprises: grounding the defective sub-segment by electrically coupling the defective sub-segment with a ground line. In a fourth example of the method, optionally including one or more or each of the first through third examples, identifying the sub-segment in which the defect is located further comprises using one of an Electron Beam Induced Current (EBIC) and thermal imaging to detect a leakage of electricity from the sub-segment. In a fifth example of the method, optionally including one or more or each of the first through fourth examples, identifying the sub-segment in which the defect is located further comprises: for each sub-segment of the plurality of sub-segments: measuring a first signal via the readout electronics, cutting off a connection between the sub-segment and the readout electronics, measuring a second signal at the readout electronics, in response to a change between the first signal and the second signal being within a range indicating that the sub-segment is defective, permanently severing the connection between the sub-segment and the readout electronics, and in response to the change between the first signal and the second signal not being within the range indicating that the sub-segment is defective, restoring the connection between the sub-segment and the readout electronics. In a sixth example of the method, optionally including one or more or each of the first through fifth examples, cutting off the connection between the sub-segment and the readout electronics further comprises one of severing the connection with a laser and adjusting a switch arranged on the connection from a closed position to an open position. In a seventh example of the method, optionally including one or more or each of the first through sixth examples, the method further comprises: restoring the connection between the sub-segment and the readout electronics by one of repairing the connection with a laser weld and adjusting a switch arranged on the connection from the open position to the closed position. In a eighth example of the method, optionally including one or more or each of the first through seventh examples, each sub-segment includes a switch on the connection between the sub-segment and the readout electronics. In a ninth example of the method, optionally including one or more or each of the first through eighth examples, a plurality of switches arranged on connections between a respective plurality of sub-segments and the readout electronics are adjusted from the closed position to the open position by applying a voltage to one signal source.

The disclosure also provides support for a photon counting computed tomography (PCCT) imaging system, comprising: a photon counting detector including a sensor array, the sensor array including a plurality of segments, at least one of the plurality of segments divided into a plurality of sub-segments, each sub-segment of the plurality of sub-segments electrically coupled to a readout electronics of the sensor array, and one or more processors, and a non-transitory memory storing instructions executable by the one or more processors to: for a segment of the at least one of the plurality of segments: calculate, at the readout electronics, a total photon count for the segment based on combined signals received from each sub-segment of the plurality of sub-segments, and reconstruct an image based on the total photon count for the segment. In a first example of the system, the plurality of sub-segments are electrically coupled to the readout electronics via a corresponding plurality of individual connections to a shared trace coupled to the readout electronics. In a second example of the system, optionally including the first example, a plurality of switches are arranged on the plurality of individual connections, each switch of the plurality of switches operable to connect or disconnect one or more sub-segments from the readout electronics. In a third example of the system, optionally including one or both of the first and second examples, the plurality of sub-segments are electrically coupled in series, one sub-segment electrically coupled to the readout electronics. In a fourth example of the system, optionally including one or more or each of the first through third examples, the system further comprises: a ground line electrically coupled to a ground bus of the PCCT imaging system, the ground line electrically couplable to each sub-segment of the plurality of sub-segments.

The disclosure also provides support for a method for a photon counting computed tomography (PCCT) imaging system, the method comprising: in response to detecting a defect in a segment of a sensor array of a photon counting detector of the PCCT imaging system, the segment including a plurality of sub-segments: identifying a defective sub-segment of the segment, by iteratively isolating each sub-segment of the plurality of sub-segments from readout electronics configured to measure a combined signal comprising signals produced by the plurality of sub-segments, and comparing a first measured combined signal of the plurality of sub-segments prior to isolating the sub-segment with a second measured combined signal after isolating the sub-segment, and repairing the segment by permanently severing a connection between the defective sub-segment and the readout electronics. In a first example of the method, iteratively isolating each sub-segment of the plurality of sub-segments from the readout electronics further comprises, for each sub-segment of the plurality of sub-segments, severing a connection between the sub-segment and the readout electronics with a laser, and responsive to a sub-segment being identified as non-defective, repairing the severed connection between the sub-segment and the readout electronics prior to a next iteration. In a second example of the method, optionally including the first example, identifying the defective sub-segment by iteratively isolating each sub-segment from the readout electronics and comparing the first measured combined signal with the second measured combined signal further comprises determining whether a change between the first measured combined signal and the second measured combined signal is within a range indicating that the isolated sub-segment is defective. In a third example of the method, optionally including one or both of the first and second examples, iteratively isolating each sub-segment of the plurality of sub-segments from the readout electronics further comprises, for each sub-segment of the plurality of sub-segments, applying a first voltage to a gate of at least one switch arranged on a connection between the sub-segment and the readout electronics to open the connection, and responsive to a sub-segment being identified as non-defective, performing one of discontinuing the first voltage or applying a second voltage to the gate of the at least one switch to close the connection and reconnect the sub-segment to the readout electronics prior to a next iteration. In a fourth example of the method, optionally including one or more or each of the first through third examples, the method is performed periodically to proactively check for a degradation in one or more segments of the sensor array.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for a photon counting computed tomography (PCCT) imaging system, the method comprising:
    for each pixel along a sensor array, the sensor array comprising a plurality of vertically stacked segments including at least one divided segment comprising a plurality of sub-segments electrically coupled to a readout electronics configured to calculate a photon count for each sub-segment of the at least one divided segment, the plurality of vertically stacked segments extending below each pixel and oriented in a direction of incoming X-ray beams,
    generating a total photon count for the at least one divided segment based on combined electrical signals produced at each sub-segment of the at least one divided segment, the photon count for each sub-segment being calculated based on electrical signals; and
    reconstructing an image based on the total photon count at the at least one divided segment.

2. The method of claim 1, further comprising, detecting a defect in the divided segment based on at least one of an occurrence of high leakage currents, an occurrence of short circuits, and generation of image artifacts in the reconstructed image;
    in response to detecting the defect in the divided segment, identifying a sub-segment of the divided segment in which the defect is located;
    repairing the divided segment by severing a connection between the defective sub-segment and the readout electronics;
    generating another total photon count for the divided segment based on combined electrical signals produced at each non-defective sub-segment of the divided segment; and
    reconstructing an image based on the other total photon count.

3. The method of claim 2, wherein at least one sub-segment of the plurality of sub-segments is different in size than the other sub-segments of the plurality of sub-segments of the divided segment and wherein identifying the sub-segment of the divided segment in which the defect is located and repairing the divided segment by severing a connection between the defective sub-segment and the readout electronics is performed by a manufacturer of the sensor array.

4. The method of claim 3, further comprising grounding the defective sub-segment by electrically coupling the defective sub-segment with a ground line.

5. The method of claim 3, wherein identifying the sub-segment in which the defect is located further comprises using one of an Electron Beam Induced Current (EBIC) and thermal imaging to detect a leakage of electricity from the sub-segment.

6. The method of claim 3, wherein identifying the sub-segment of the divided segment in which the defect is located further comprises:
    for each sub-segment of the plurality of sub-segments:
        measuring a first signal via the readout electronics prior to cutting off a connection between the sub-segment and the readout electronics, the first signal being a total signal received at the readout electronics from all sub-segments of the divided segment;
        cutting off a connection between the sub-segment and the readout electronics;
        measuring a second signal at the readout electronics, second signal being a total signal received at the readout electronics from all non-severed sub-segments of the divided segment;
        in response to a change between the first signal and the second signal being within a range indicating that the sub-segment is defective, permanently severing the connection between the sub-segment and the readout electronics; and
        in response to the change between the first signal and the second signal not being within the range indicating that the sub-segment is defective, restoring the connection between the sub-segment and the readout electronics.

7. The method of claim 6, wherein the range comprises a plurality of ranges, the plurality of ranges covering smaller-than-expected signals and large, undesirable signals and cutting off the connection between the sub-segment and the readout electronics further comprises one of severing the connection with a laser and adjusting a switch arranged on the connection from a closed position to an open position.

8. The method of claim 7, further comprising restoring the connection between the sub-segment and the readout electronics by one of repairing the connection with a laser weld and adjusting a switch arranged on the connection from the open position to the closed position.

9. The method of claim 7, wherein each sub-segment includes a switch on the connection between the sub-segment and the readout electronics.

10. The method of claim 9, wherein a plurality of switches arranged on connections between a respective plurality of sub-segments and the readout electronics are adjusted from the closed position to the open position by applying a voltage to one signal source.

11. A photon counting computed tomography (PCCT) imaging system, comprising:
    a photon counting detector including a sensor array, the sensor array including a plurality of segments, at least one of the plurality of segments divided into a plurality of sub-segments, wherein the plurality of sub-segments is electrically coupled in series and at least one sub-segment is electrically coupled to the readout electronics; and one or more processors, and a non-transitory memory storing instructions executable by the one or more processors to:
  for a segment of the at least one of the plurality of segments:
    calculate, at the readout electronics, a total photon count for the segment based on combined signals received from each sub-segment of the plurality of sub-segments; and
    reconstruct an image based on the total photon count for the segment.

12. The system of claim 11, wherein each sub-segment of the plurality of sub-segments is electrically coupled to a readout electronics of the sensor array.

13. The system of claim 12, wherein the plurality of sub-segments are electrically coupled to the readout electronics via a corresponding plurality of individual connections to a shared trace coupled to the readout electronics a plurality of switches are arranged on the plurality of individual connections, each switch of the plurality of switches operable to connect or disconnect one or more sub-segments from the readout electronics.

14. The system of claim 13, wherein a plurality of switches are arranged on the plurality of individual connections, each switch of the plurality of switches operable to connect or disconnect one or more sub-segments from the readout electronics.

15. The system of claim 11, further comprising a ground line electrically coupled to a ground bus of the PCCT imaging system, the ground line electrically couplable to at least one sub-segment of the plurality of sub-segments.

16. A method for a photon counting computed tomography (PCCT) imaging system, the method comprising:
  in response to detecting a defect in a divided segment of a sensor array of a photon counting detector of the PCCT imaging system, the divided segment including a plurality of sub-segments and the defect being detected by a presence of high leakage currents and short circuits and generation of image artifacts in a reconstructed image generated based total photon count of the divided segment, the total photon count being based on a combined signal:
    identifying a defective sub-segment of the segment, by iteratively isolating each sub-segment of the plurality of sub-segments from readout electronics configured to measure the combined signal, the combined signal comprising signals produced by each sub-segment of the plurality of sub-segments, each respective signal being used to determine a photon count for a respective sub-segment, and comparing a first measured combined signal of the plurality of sub-segments prior to isolating the sub-segment with a second measured combined signal after isolating the sub-segment; and
    repairing the segment by permanently severing a connection between the defective sub-segment and the readout electronics.

17. The method of claim 16, wherein iteratively isolating each sub-segment of the plurality of sub-segments from the readout electronics further comprises, for each sub-segment of the plurality of sub-segments, severing a connection between the sub-segment and the readout electronics with a laser, and responsive to a sub-segment being identified as non-defective, repairing the severed connection between the sub-segment and the readout electronics prior to a next iteration.

18. The method of claim 16, wherein identifying the defective sub-segment by iteratively isolating each sub-segment from the readout electronics and comparing the first measured combined signal with the second measured combined signal further comprises determining whether a change between the first measured combined signal and the second measured combined signal is within a range indicating that the isolated sub-segment is defective.

19. The method of claim 16, wherein iteratively isolating each sub-segment of the plurality of sub-segments from the readout electronics further comprises, for each sub-segment of the plurality of sub-segments, applying a first voltage to a gate of at least one switch arranged on a connection between the sub-segment and the readout electronics to open the connection, and responsive to a sub-segment being identified as non-defective, performing one of discontinuing the first voltage or applying a second voltage to the gate of the at least one switch to close the connection and reconnect the sub-segment to the readout electronics prior to a next iteration.

20. The method of claim 16, where the method is performed periodically to proactively check for a degradation in one or more segments of the sensor array.

* * * * *